US012634555B2

(12) United States Patent
Sipolins et al.

(10) Patent No.: US 12,634,555 B2
(45) Date of Patent: May 19, 2026

(54) SYSTEMS AND METHODS FOR MODIFYING CONTENT BASED ON SPATIAL CONTEXT

(71) Applicant: Adeia Guides Inc., San Jose, CA (US)

(72) Inventors: Aldis Sipolins, Somerville, MA (US); Jean-Yves Couleaud, Mission Viejo, CA (US); Ning Xu, Irvine, CA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/900,487

(22) Filed: Sep. 27, 2024

(65) Prior Publication Data

US 2026/0095623 A1 Apr. 2, 2026

(51) Int. Cl.
H04N 21/442 (2011.01)
H04N 21/414 (2011.01)

(52) U.S. Cl.
CPC ..... H04N 21/44218 (2013.01); H04N 21/414 (2013.01)

(58) Field of Classification Search
CPC .......... H04N 21/44218; H04N 21/414; H04N 21/25841; G06F 3/011; G06F 16/587; G06F 3/0346
USPC ........................................................ 725/14
See application file for complete search history.

(56) References Cited

U.S. PATENT DOCUMENTS 11,257,119 B2   2/2022  Pittman
11,368,231 B1 * 6/2022  Dodds ..................... G06F 3/165

2005/0108646 A1   5/2005  Willins et al.
2006/0293839 A1 * 12/2006  Stankieiwcz .......... G01C 21/20
                                            701/434
2011/0283328 A1   11/2011  Davis et al.
2013/0316679 A1 * 11/2013  Miller ..................... H04R 1/08
                                            455/569.1
2015/0006278 A1   1/2015  Di Censo et al.
2015/0177006 A1 * 6/2015  Schulz .................. H04W 4/024
                                            701/537
2015/0212595 A1 * 7/2015  Liu ..................... G06K 7/10544
                                            345/156
2016/0124707 A1 * 5/2016  Ermilov ................. H04R 27/00
                                            345/156
2017/0358142 A1 * 12/2017  Lee ........................ H04W 4/026
2018/0073889 A1 * 3/2018  Vigilante .............. G06F 3/0481

(Continued)

OTHER PUBLICATIONS

A. Chianese, F. Marulli, V. Moscato and F. Piccialli, "SmARTweet: A Location-Based Smart Application for Exhibits and Museums," 2013 International Conference on Signal-Image Technology & Internet-Based Systems, Kyoto, Japan, 2013, pp. 408-415, doi: 10.1109/SITIS.2013.73. (Year: 2013).*

(Continued)

*Primary Examiner* — Cynthia M Fogg
(74) *Attorney, Agent, or Firm* — HG LAW LLP

(57) ABSTRACT

In an example system, within proximity of a geospatially stationary first device that is configured to output a primary content, the system detects a second device and a potential viewer of the geospatially stationary first device. The system selects supplemental content for output by the second device based on spatial arrangement of the first device, the second device, and the potential viewer and the metadata of the primary content displayed by the first device. The system causes the second device to output the supplemental content.

20 Claims, 18 Drawing Sheets

(56) References Cited

U.S. PATENT DOCUMENTS

| | | | | |
|---|---|---|---|---|
| 2019/0266643 A1* | 8/2019 | Cho | G08G 1/22 |
| 2020/0068245 A1 | 2/2020 | Sinnott et al. | |
| 2020/0233680 A1* | 7/2020 | Ma | G05B 19/042 |
| 2020/0320592 A1* | 10/2020 | Soule | H04W 4/10 |
| 2020/0394683 A1 | 12/2020 | Garcia et al. | |
| 2021/0233399 A1* | 7/2021 | Somanath | G08G 1/0965 |
| 2021/0334854 A1 | 10/2021 | Ueno et al. | |
| 2022/0178713 A1* | 6/2022 | Hincapie | G01C 21/20 |
| 2023/0081225 A1* | 3/2023 | Fisher-Stawinski | G08B 21/22 |
| | | | 705/2 |
| 2024/0005359 A1* | 1/2024 | Acosta | G09F 13/10 |
| 2024/0053820 A1* | 2/2024 | Adcock | G03H 1/2294 |
| 2025/0173102 A1* | 5/2025 | Austin | G09F 9/30 |

OTHER PUBLICATIONS

Amar Info Tech, "Museums Using Location Based Technology", available online at: <https://www.amarinfotech.com/museums-using-location-based-technology.html>, 2009, 6 pages.

Computer Vision, "Human Instance Segmentation", available online at: <https://paperswithcode.com/task/human-instance-segmentation>, retrieved on Dec. 9, 2024, 3 pages.

Edwards, C., "Smile for the Camera Creepy billboards are tracking British shoppers with built-in cameras that target ads based on your Mood", The Sun, available online at: <https://www.thesun.co.uk/tech/8960640/creepy-billboards-track-with-cameras/>, Apr. 29, 2019, 15 pages.

Featured installation, Holosonics, Retrieved Dec. 9, 2024.

Mathur, S., "Digital out-of-home ads now in Display & Video 360", available online at: <https://blog.google/products/marketingplatform/360/digital-out-of-home-ads-now-in-display-video-360/>, Aug. 25, 2022, 7 pages.

Meta Horizon, "Build Local Multiplayer Experiences With Shared Spatial Anchors on Meta Quest", available online at: <https://developers.meta.com/horizon/blog/build-local-multiplayer-experiences-shared-spatial-anchors/>, Dec. 16, 2022, 6 pages.

U.S. Appl. No. 18/900,494, filed Sep. 27, 2024, Aldis Sipolins.

* cited by examiner

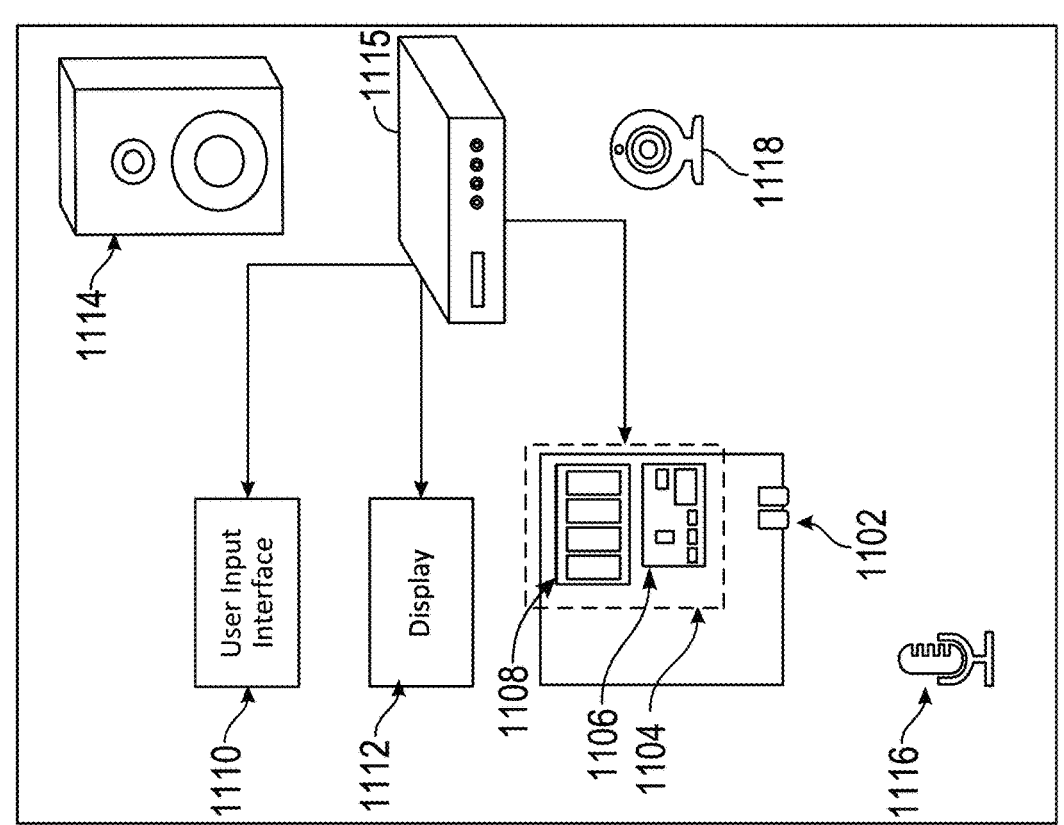
FIG. 11
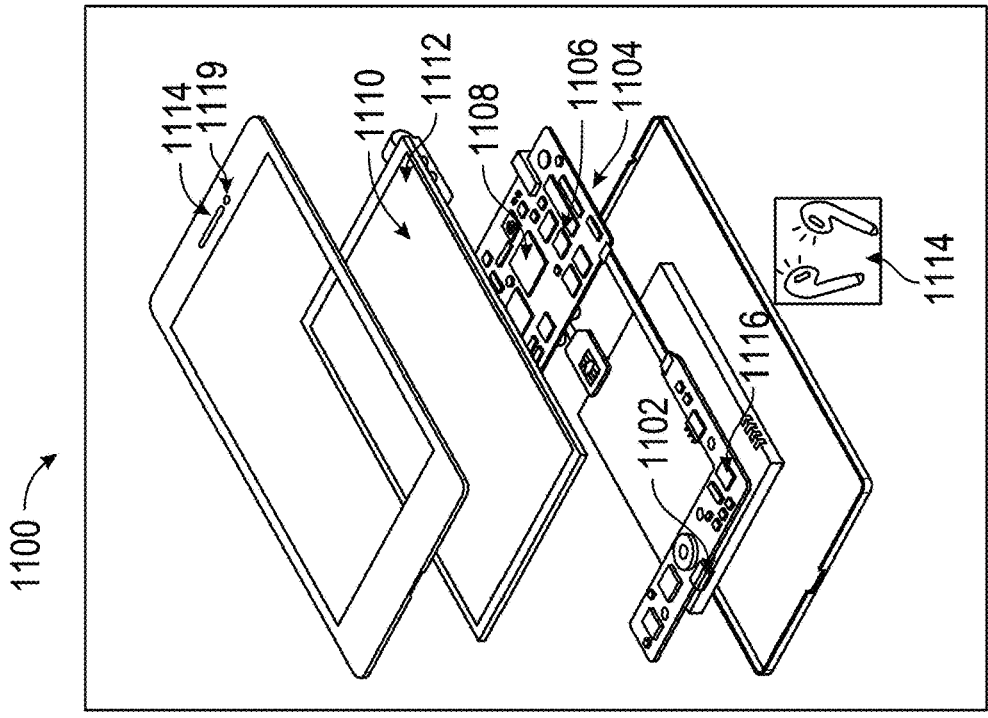

SYSTEMS AND METHODS FOR MODIFYING CONTENT BASED ON SPATIAL CONTEXT

BACKGROUND

This disclosure relates to systems and methods for modifying primary content and/or secondary mobile supplemental content based on a spatial arrangement of device(s).

SUMMARY

Geospatially fixed media devices inherently have a limited exposure to potential viewers based on their specific geographic locations. These devices can only expose content to potential viewers within a specific geographic area and based on the potential viewers' line of sight to the display of the device. With this limited exposure, geospatially fixed devices often fail to provide potential viewers with relevant visual information, such as safety hazards, museum exhibits, directions, or other information.

In one approach, a geospatially fixed device may alter its displayed content in order to garner potential viewers' attention. For example, a geospatially fixed device may use cameras to detect potential viewers and select content based on detected features of the viewers such as age, gender, mood, and even the make and model of cars that drive by the display. However, the fixed device may require a larger power source and greater memory capacity to power and operate the camera. Camera installation and maintenance require specialty training and may be labor-intensive. For example, cameras on geospatially fixed devices located outside may have performance or degradation issues due to environmental weather conditions. For example, moisture may cause short circuits; prolonged exposure may cause corrosion; or debris, such as dust, dirt, insects, etc., may build up, blocking or damaging a lens or sensor, rendering the camera inoperable. Maintenance may also be required due to vandalism of a visually apparent camera. Additionally, a camera may offer limited exposure. For example, cameras have a limited field of view and focal length. While a camera does provide a means for detection, it does not address a potential viewer or device that is not facing the fixed device or turns away from the fixed device. Similarly, a camera may not detect a user who is in proximity of the fixed device and in the appropriate orientation to have at least a partial view of the device if the user is not in the camera's field of view. In this case, a camera on the fixed device would miss an opportunity to garner a potential viewer's attention or may waste bandwidth and power transmitting and outputting information for a potential viewer who will not see the displayed content.

In another approach, geofencing technologies may be incorporated to enable geospatially fixed devices to detect nearby devices and potential viewers and deliver content via a push notification to the nearby devices or change content based on the proximity to the geospatially fixed device. However, geofencing fails to account for potential viewers' line of sight to the display of the fixed device and does not consider spatial arrangement of the potential viewers with respect to the fixed device. For example, museum exhibits may have curated audio per room or an audio tour that may be delivered based on the Bluetooth signal of a wearable museum device. A museum visitor may be interested in a particular exhibit or piece of art, such as the Mona Lisa. The museum visitor may be in the geofence of the Mona Lisa, thereby triggering the content to play on the museum device, but the viewer may not be in a spatial position or orientation to view the Mona Lisa due to a crowd or obstruction in the room. Alternatively, a museum visitor may be looking at a different piece of art, but the geofence detects the museum device within proximity of the Mona Lisa and plays the Mona Lisa content despite the viewer enjoying other art. In another example, a nearby device may transmit its identification of objects in the environment through which it traverses to a geospatially fixed device (e.g., billboard). For example, sensors of a taxi with digital signage may recognize consumers at a dog park by identifying a plurality of dogs and may cause a server to transmit a dog treat advertisement to the fixed device. However, potential viewers may be preoccupied watching the dogs at the park and may never see the transmitted advertisement. Both of these examples transmit content without consideration of viewability by the potential viewer and consume unnecessary resources (e.g., bandwidth, device power, server energy, computational resources, advertising costs, etc.).

In another approach, audio devices can be incorporated into visual-only fixed devices, such as billboards, posters, paintings, displays, etc., to increase the effectiveness of exposing potential viewers to their content. However, putting speakers on, for example, a billboard may require a considerably loud audio volume to cover the device's distance from potential viewers, in which the audio volume may be considered an unacceptable noise level, for example greater than 70 dB, that would preclude their use. In the same regard, soundscapes produced on external speakers in a museum need to be moderated so as to prevent audio crossover from proximate exhibits. While quieter directional speakers may be incorporated into the fixed devices to provide an approach to localizing sound, such an approach requires specialized hardware and is limited to environments with minimal obstructions and low background noise, and is also limited to line of sight applications. In particular museum exhibits or in a case of a billboard displaying emergency safety information in a hazardous situation like a storm evacuation, these conditional use limitations are not adequate.

In another approach, technologies such as cameras, GPS, fiducial markers, lidar, sensors, and control circuitry for visual segmentation and pose reconstruction may be incorporated into the geospatially fixed device. Such integration would require use of high-cost equipment, labor-intensive set-ups utilizing professionals with specialty training, and continuous maintenance of additional infrastructure. Technologies, such as GPS and geofencing, would require continuous updating for accuracy, for example updates regarding additional or alternative signal sources or technologies. Adequate connection strength and compute power are required for the circuitry for visual segmentation and pose reconstruction. Other resources, for example, battery capacity, bandwidth, network protocol, environmental durability, and data storage and processing, must also be considered for each location in which an enabled geospatially fixed device is required. Due to the capital requirements of such integrations, the scalability of this approach is limited.

Accordingly, there is a need to provide spatially contextual supplemental content based on the provision of information utilizing available mobile devices. Such a solution leverages the mobile devices' eligible technologies to increase the fixed devices' exposure to potential viewers.

To help address these problems, systems and methods are provided herein for modifying content based on spatial context (e.g., in a museum setting or safety situations).

In one approach, the system may track user spatial arrangement to reduce the resources (e.g., bandwidth, device power, server energy, computational resources, advertising costs, etc.) that would be consumed for otherwise transmitting and displaying content regardless of viewership. For example, the system may provide supplemental content of a lower file size incorporating direction or orientation to a geospatially fixed device showing content. Only when the system detects that the user is viewing the content does the system transmit a more substantial secondary content (e.g., larger file size, less compressed formatting, greater bandwidth, higher quality, greater processing power, etc.). For example, the geospatially fixed device is configured to display content (e.g., a digital display related to a museum exhibit) and a mobile device (e.g., a museum-issued guidance device, audio headset, AR headset, smartphone, etc.) is configured to provide supplemental content (e.g., audio or visual media). The system may include a media application running via control circuitry on one or more of the fixed devices, the mobile device, a server, and/or any other suitable devices or computing devices, or any combination thereof. The system may track a user (e.g., a museum visitor walking through the museum) and may detect the user moving into proximity of the geospatially fixed device (e.g., digital display related to a museum exhibit). The proximity of the geospatially fixed device may be defined by a media landscape of the device, and the media landscape may include one or more media play areas designated to play one or more different supplemental contents. For example, the media application may be used to determine the proximity and spatial arrangement (e.g., horizontal position, vertical position, and/or orientation) of a potential user relative to the fixed device and relative to the mobile device through the combination of technologies shared between the fixed device, the mobile device, and any other suitable devices or computing devices, or any combination thereof. These technologies may include cameras, GPS, fiducial markers, lidar, sensors, and control circuitry for visual segmentation and pose reconstruction. For example, the media application may determine the user is within proximity of the fixed device and is to the right and facing away from the fixed device. The mobile device may then be utilized to provide supplemental content related to the metadata of the fixed device content and the user's spatial arrangement with respect to the fixed device. For example, in a museum, a museum device (e.g., mobile device) may play supplemental audio content stating "Please look left to view the Mona Lisa." In one embodiment, the media application may further detect one or more changes in the spatial arrangement of the user and adjust the supplemental content based on the changes. For example, the visitor (e.g., user) may turn towards the Mona Lisa, and the museum device may output a more substantial content item: "The Mona Lisa was painted by Leonardo da Vinci . . . for more work by Leonardo da Vinci, please turn around." In some embodiments supplemental content may be limited to high value fixed devices to prevent the system from generating, transmitting and outputting supplemental content for lower interest objects. For example high value objects could be determined by a preset point of interest (e.g., the Mona Lisa), weighting fixed devices based on detected trends relevant to the object (e.g., through collected sensor data showing increased/decreased viewership of the object, or through social media or news data trending), weighting fixed devices based on the distance of the fixed device from the user, presenting weights for a plurality of fixed devices, receiving user input to select weights (e.g., preferences) for a plurality of fixed devices, or weighting fixed devices based on user behavior or emotion. A system that selects and plays supplemental content based on the spatial arrangement of a first device, a second device, and a potential viewer increases the exposure of the geospatially fixed device to the viewer and limits the transmission of unrelated and/or unconsumed content.

With the growing availability of devices containing various technologies capable of determining spatial arrangement, a system for leveraging these devices to increase the exposure of geospatially fixed devices becomes feasible without additional infrastructure through the coordination of information and technologies of the various devices. For example, in a safety situation, utilizing all potential eligible devices nearby or recruiting eligible nearby devices would greatly increase the exposure of a geospatially fixed device, for example a billboard, that is configured to display content related to the safety event, for example weather conditions and/or evacuation instructions for an oncoming hurricane. Eligible nearby devices may include devices that are generally portable or mobile, have connectivity capability, and have some output capability (audio, visual, haptics, etc.), for example, smartphones, AR headsets, audio headsets, visual projectors, vehicles, electric bikes and scooters, robots and other robotic devices, etc. An eligible device may move into proximity of the billboard and may be utilized, individually or in coordination, to provide supplemental content (e.g., audio or visual media) related to the metadata of the billboard content. Alternatively, these eligible devices may be routed to the location of the fixed device to support the exposure of the fixed device content. The media application may detect the spatial arrangement (e.g., position and/or orientation) of a potential viewer relative to the billboard and to the eligible devices. Supplemental content may be generated based on the eligible capabilities of each eligible device (e.g., headset speakers, headset displays, outward-facing speakers, directional speakers, dynamic paint, touch-screen displays, visual overlays, projectors, electric bikes and scooters, robots and other robotic devices etc.). For example, the media application may detect a pedestrian walking by a billboard, located to the left of the pedestrian, displaying an evacuation route. The pedestrian's smartphone, in emergency mode, plays the message, "The latest evacuation route is displayed to your left." Utilizing eligible devices to supplement the exposure of a fixed device using spatial arrangement, such as the pedestrian's personal device, reduces infrastructure, cost, and maintenance as compared to integrating these technologies into one fixed device.

Using the methods described herein, the content of fixed and supplemental devices may be selected and adjusted based on spatial arrangement of a potential viewer, for example in a museum or in response to a safety event. The system generates content based on the capability of eligible supplemental devices in proximity of the geospatially fixed device.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 11 depicts an illustrative user equipment 1100 and 1101, in accordance with some embodiments of this disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION OF THE DRAWINGS

As referred to herein, the phrase "spatial arrangement" refers to the organization and positioning of devices, people, objects, elements, or entities in a given space or environment. In some embodiments, the spatial arrangement is defined by distance, direction, orientation, proximity, and alignment of supplemental devices, potential viewers, objects, elements, or entities in relation to a geospatially fixed device. In some embodiments, spatial arrangement is in relation to only the geospatially fixed device and the viewer, only the geospatially fixed device and the second device, or only the viewer and the second device.

Figure 1:
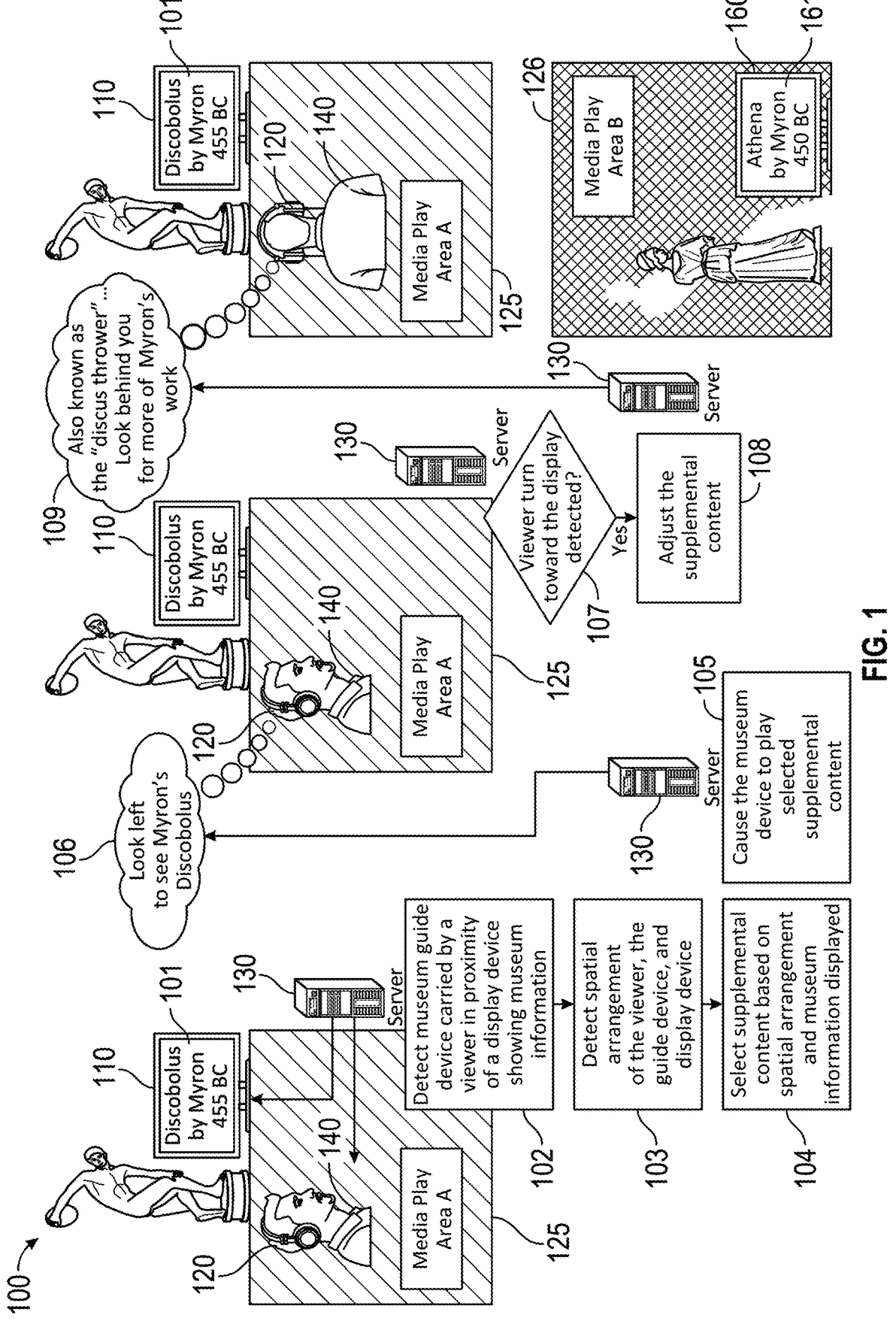
FIG. 1 depicts a schematic illustration of selecting supplemental content based on spatial arrangement and metadata of the displayed primary content, in accordance with some embodiments of the disclosure.

FIG. 1 depicts a schematic illustration of selecting supplemental content (e.g., 106 and 109) based on spatial arrangement and metadata of the displayed primary content, in accordance with some embodiments of the disclosure.

In some embodiments, system 100 includes a server 130, geospatially fixed devices (e.g., 110 and 160), and mobile device (e.g., 120). The system may have a non-transitory memory storing instructions that when executed cause a media application to run and control the system. The media application may be running via control circuitry (e.g., 1104 of FIGS. 11, 1211 of FIG. 12) on one or more of the fixed devices, the mobile services, a server, and/or any other suitable devices or computing devices, or any combination thereof. At 102, server 130 control circuitry, running the media application, detects a viewer 140 and a museum guide device 120 carried or worn by the viewer in proximity of a display device 110 showing museum information 101. In some embodiments, the proximity of the display device 110 is defined using a media play area (e.g., 125 and 126).

At 103, server 130 control circuitry, running the media application, detects the spatial arrangement of the viewer 140, the museum guide device 120, and display device 110. For example, spatial arrangement detected by the media application may include a spatial position of the potential viewer relative to the first device, a spatial orientation of the potential viewer relative to the first device, and a spatial position of the second device relative to the first device. Control circuitry, running the media application, may detect a vertical position of the potential viewer and the second device relative to the first device, a horizontal position of the potential viewer and the second device relative to the first device, and the line of sight of the potential viewer relative to the first device. For example, the system may perform skeletal reconstruction to identify the viewer's head position and reconstruct the viewer's line of sight from the skeletal reconstruction. Alternatively, the system may identify viewer position or device position, if skeletal reconstruction is unavailable. Detection may be achieved through the combination of technologies shared between the display device, the museum guide device, and any other suitable devices or computing devices, or any combination thereof. These technologies may include cameras, GPS, fiducial markers, lidar, sensors, and control circuitry for visual segmentation and pose reconstruction. The system may use existing methods to determine device proximity to an eligible device and trigger an application programming interface (API) call for relevant content information. Devices with the necessary hardware may employ radio frequency (RF) signaling and detection techniques such as location beacons to detect that a Bluetooth device or Wi-Fi network is within range and above a certain signal strength level. Alternatively, the supplemental device may access Global Positioning System (GPS) coordinates available to the device directly or via a paired peripheral (e.g., smartwatch, smartphone) and check an online database of enabled fixed device locations to identify if the device coordinates are within range of any qualifying fixed devices. A fiducial marker embedded in the fixed device may similarly trigger an API call upon being scanned by an eligible device. The system may employ these techniques to non-digital content (e.g., paper posters and billboards) without requiring additional hardware.

In some embodiments, the system may determine the spatial features that can be identified given the available device capabilities or determine additional devices to identify spatial features that are required for a particular content item. For example, some spatial features may be captured via multiple alternate sets of sensors, in which case the supplemental device may activate a preferred set of sensors based on preferences or constraints on battery, bandwidth, or compute power. Supplemental device properties such as connection strength and compute power may determine eligibility to deliver supplemental content. A minimum threshold for compute power may be applied to ensure that a device will be able to perform actions such as visual segmentation and human pose reconstruction accurately and quickly. Different compute thresholds may be established for different capabilities, such as a low threshold for visual segmentation (e.g., 10% of processor power of control circuitry 1104 of FIG. 11) and a higher threshold (e.g., 20% of processor power of control circuitry 1104 of FIG. 11) for pose reconstruction (which is an additional step above visual segmentation). Thresholds may similarly be applied for features such as refresh rate and response time.

In some embodiments, at 104, server 130 control circuitry, running the media application, selects supplemental content 106 based on the detected spatial arrangement of the viewer 140, and the metadata of museum information 101 displayed on the display device 110. For example, the media application may, based on the position (e.g., vertical, horizontal, location within a media play area of an audio landscape, etc.) and orientation of the viewer (e.g., line of sight, body position, etc.), generate a directional cue or cue to orient the visitor towards the display device 110 or another point of interest (e.g., another exhibit, the café, gift shop, lecture hall, etc.). For example, a directional cue may include a visual or audio output that states "Proceed upstairs and to the left for more information." For example, a cue to orient may include "Look left to see Myron's Discobolus" or "Though you can't see it, you may smell coffee from the coffee shop."

In some embodiments, server 130 control circuitry, running the media application, may select supplemental content containing the generated directional cue or cue to orient that is stored in a database. For example, the database may store standard phrases and spatial arrangement cues (e.g., generated directional cue or cue to orient) separately or as one content item. The selecting may include selecting a single content item or appending selected data to generate content for output. The database may be updated at regular intervals or updated based on dynamic generation of content, further discussed below. The database may include content designated to play based on the detection of a particular spatial arrangement (e.g., direct line of sight determined through pose reconstruction). The database, or portions thereof, may be stored on a local server, an external server, a cloud server, the fixed device, supplemental devices, and/or any other suitable devices or computing devices, or any combination thereof.

In another embodiment, server 130 control circuitry, running the media application, may select a newly generated supplemental content based on the generation of content. For example, the system may communicate with a pre-trained large language model (LLM) model to generate a script for supplemental audio content. The system may aggregate and pre-process data, for example into a database, to ensure it is in a format suitable for input into the LLM. For example, the system may create or retrieve from storage a contextual prompt to send to the LLM based on the spatial features, contextual features, or categorized data (e.g., environmental, audience characteristics, spatial arrangement, and other relevant factors) identified. For example, "Generate an engaging audio script for this exhibit: [exhibit description] in this situation: the environment conditions: [environmental conditions], the audience characteristics [audience information], the spatial arrangement: [spatial arrangement]." The system will populate the bracketed elements using detected or stored data, resulting in a generated script that is personalized and adapted to the environment. For instance, if the system detects that a viewer is not in line of sight of the exhibit, the media application may modify the script to highlight the direction to look for the exhibit. In some embodiments, the system may be configured to provide weights with the data elements of the prompt to designate prioritized data. The system may store the generated content to a database for subsequent selection. For example, the system may determine detected conditions of the bracketed elements match previous conditions where the generated content may be selected from a database instead of being regenerated.

In one embodiment, the system categorizes the aggregated data into different types such as demographic information, environmental conditions, and spatial arrangements, and assigns each category of data a weight based on its relevance to the exhibit. For instance, the system may assign a higher weight to audience demographics than ambient noise levels when generating supplemental content for a visual product. The system may transmit a finalized text script to a text-to-speech (TTS) engine for real-time audio synthesis. The TTS engine converts the text into natural-sounding speech, ready for output.

In some embodiments, at 105, server 130 control circuitry (e.g., 1104 of FIGS. 11, 1211 of FIG. 12), running the media application, causes the museum device 120 to play selected supplemental content 106. For example, the media application detects viewer 140 with museum guide device 120 within proximity of the display device 110, where proximity is defined by media play area A 125. The media application may further detect that the viewer 140 is to the right and facing away from the display device 110. Based on this detection, the media application may select supplemental content to orient the viewer's line of sight to the exhibit's display device 110. For example, the museum guide device may generate and select audio supplemental content 106 stating "Look left to see Myron's Discobolus," to orient the viewer before presenting further supplemental content based on the metadata of the display device 110. The selected supplemental content may be transmitted from the server 130 to the museum guide device 120 for output.

In some embodiments, at 107, server 130 control circuitry, running the media application, may further detect changes in the spatial arrangement of the viewer and, at 108, adjust the supplemental content based on the change. For example, the media application may detect that the viewer 140 has turned towards the display device 110, and, as described above, the media application may select an updated supplemental content 109 relevant to the detected change in spatial arrangement. The media application would transmit the selected supplemental content 109 to the museum device 120 for output. For example, upon the media application detecting that the viewer 140 is in line of sight of the display device 110, the media application may select supplemental content 109 that is more substantial content (e.g., larger file size, less compressed formatting, greater bandwidth, higher quality, greater processing power, etc.). Alternatively, the media application may detect the viewer has, instead of turning toward the first display device, entered media play area B 126 of a second museum display device 160 and select the supplemental content based on the detected spatial arrangement with respect to second museum display device 160 and the metadata of the content 161 of the second museum display device.

In another embodiment, server 130 control circuitry, running the media application, may send supplemental content to dedicated supplemental devices. For example, display device 110 may have installed speakers or additional screens. Alternatively, the dedicated supplemental devices may be connected to a web service to retrieve relevant information. For example, the media application may detect that the viewer 140 has turned towards the display device 110 and, as described above, the media application will select an updated supplemental content 109 relevant to the detected change in spatial arrangement. The media application would transmit the selected supplemental content 109 to the dedicated supplemental devices for output.

Figure 2:
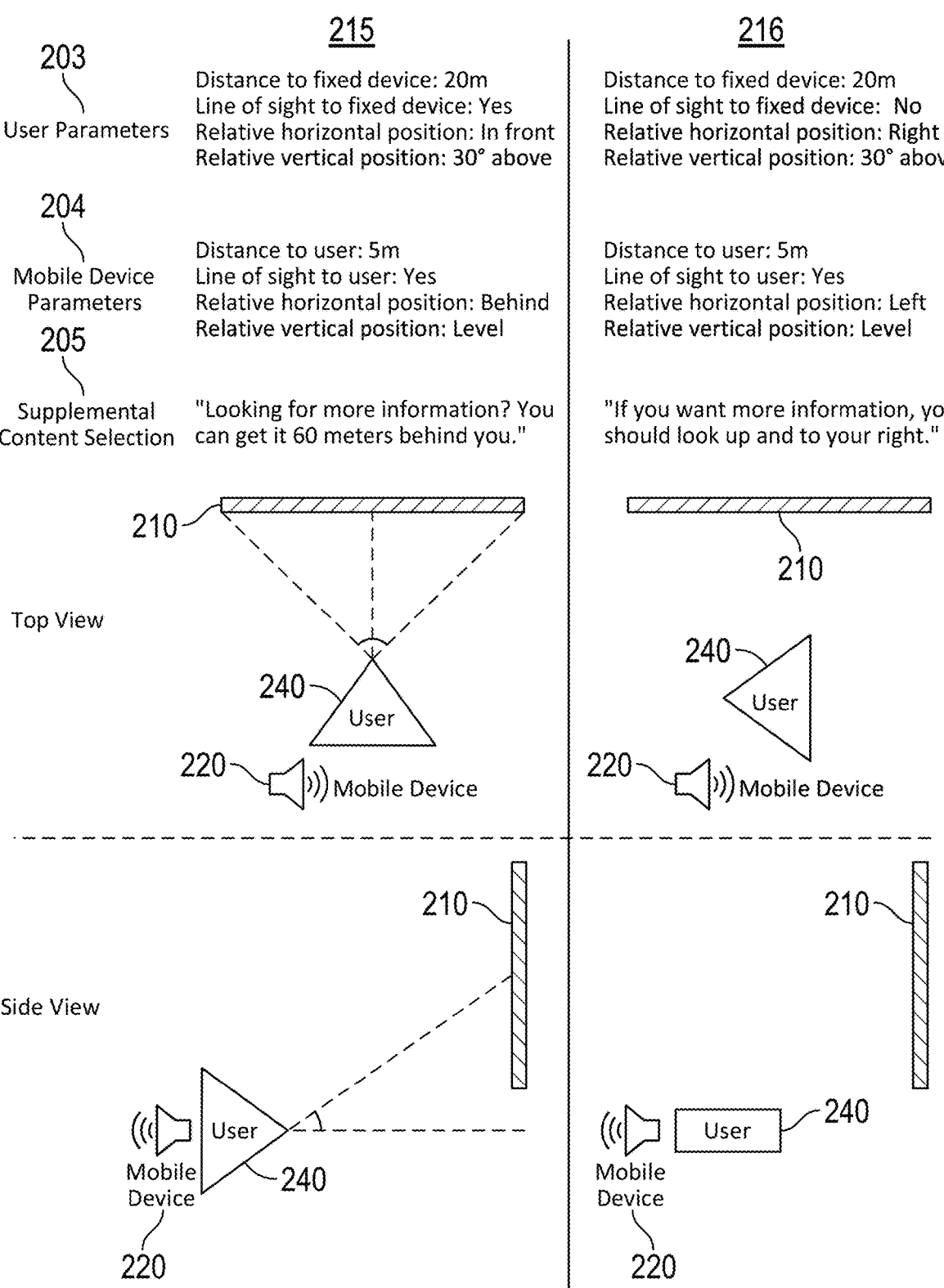
FIG. 2 depicts a schematic illustration of example parameters used in selecting supplemental content, in accordance with some embodiments of the disclosure.

FIG. 2 depicts a schematic illustration of example parameters (e.g., user parameters 203 and mobile device parameters 204) used in selecting supplemental content 205, in accordance with some embodiments of the disclosure. For example, user parameters may include or specify, user 240 distance to fixed device 210, user 240 line of sight to fixed device 210, user 240 horizontal position relative to fixed device 210, and/or user 240 vertical position relative to fixed device 210. For example, mobile device parameters may include or specify mobile device 220 distance to user 240, mobile device 220 line of sight to user 240, mobile device 220 horizontal position relative to user 240, and/or mobile device 220 vertical position relative to user 240. Additional parameters may include or specify mobile device 220 distance to fixed device 210, mobile device 220 line of sight to fixed device 210, mobile device 220 horizontal position relative to fixed device 210, and/or mobile device 220 vertical position relative to fixed device 210. As another example, the server 130 selects supplemental content 106 based on the spatial arrangement of the user 140, the museum device 120, and the fixed device 110 of FIG. 1.

In the example in scenario 215, control circuitry (e.g., 1104 of FIGS. 11, 1211 of FIG. 12), running the media application, detects the user 240 is 20 meters from the fixed device 210, the user has line of sight to the fixed device, fixed device is in front of the user, and the fixed device is 30 degrees above the user. The media application further detects mobile device 220 is 5 meters from the user 240, the mobile device has line of sight to the user, the mobile device is behind the user, and the mobile device is level with the user. Based on these parameters, the media guidance application selects supplemental content 205 using the methods described above, transmits the supplemental content 205 to the mobile device 220, and causes the mobile device 220 to output the supplemental content 205, "Looking for more information? You can get it 60 meters behind you." After selecting the supplemental content 205, the system may activate required sensors and begin monitoring relevant spatial features, as defined by the supplemental content requirements (e.g., user parameters 203 and mobile device parameters 204) over time. Such features may influence the selection of supplemental content or trigger alternate content to play. For example, the user 240 may turn left and the system may identify new user parameters 203 and new mobile device parameters 204, as indicated in scenario 216. For example, the system may monitor the viewer for proximity and detect the viewer in a media play area (e.g., 525 of FIG. 5), which is less than 15 meters from the fixed device (e.g., 510), and play message audio (e.g., 506), or the system may detect the viewer in a media play area (e.g., 521), which is 25 meters from the fixed device (e.g., 510), and play ambient audio (e.g., 511) or wait to play the message audio (e.g., 506) until the user reaches the defined distance threshold of the primary media play area.

In the example in scenario 216, control circuitry (e.g., 1104 of FIGS. 11, 1211 of FIG. 12), running the media application, detects the user 240 is 20 meters from the fixed device 210, the user does not have line of sight to the fixed device, the fixed device is to the right of the user, and the fixed device is 30 degrees above the user. The media application further detects mobile device 220 is 5 meters from the user 240, the mobile device has line of sight to the user, the mobile device is to the left of the user, and the mobile device is level with the user. Based on these parameters, the media guidance application selects supplemental content 205 using the methods described above and outputs from the mobile device 220, "If you want more information, you should look up and to your right."

In some embodiments, the system may modify or present an alternate version of supplemental content based on relevant user and environmental features such as the visual eccentricity of the content displayed on fixed device 210 (e.g., the angular distance the fixed device is from the center of a user's field of view) and ambient noise level. For example, the system may detect that a user is looking directly at the content of the fixed device. In this case, it can be assumed the content is effectively conveying detailed information to the user. However, the system may detect that a user has limited line of sight to the content (e.g., the user may be looking away from the fixed device). In this case, the same content may be ineffective. Therefore, the system may first present an alternate version of the content meant to capture a user's attention on the fixed device 210 prior to updating the displayed content based on detecting that the user's line of sight has improved.

Figure 3:
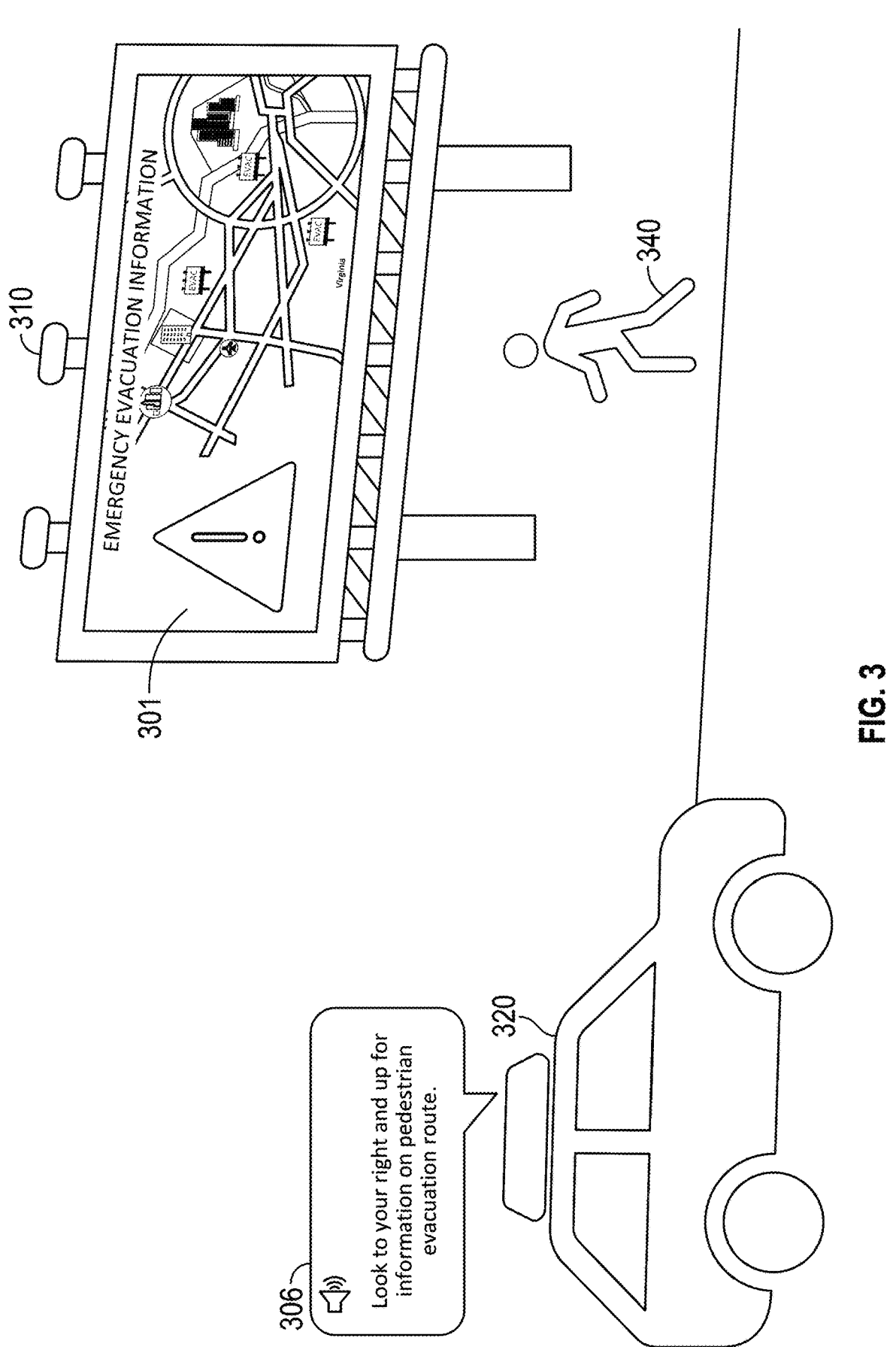
FIG. 3 depicts a schematic illustration of playing supplemental content using external speakers of a mobile device, in accordance with some embodiments of the disclosure.

FIG. 3 depicts a schematic illustration of playing supplemental content 306 using external speakers of a mobile device 320 (e.g., vehicle, smartphone, AR headset, audio headset, visual projector, electric bikes and scooters, robots and other robotic devices etc.), in accordance with some embodiments of the disclosure. For example, the mobile device 320 may play the selected supplemental content 306. The system may include a media application running, via control circuitry (e.g., 1104 of FIGS. 11, 1211 of FIG. 12), on one or more of the billboard 310, the vehicle 320, a server, and/or any other suitable devices or computing devices, or any combination thereof. The control circuitry, running the media application, may detect a pedestrian 340 within proximity of a billboard 310 displaying emergency evacuation information 301. The media application may further detect, in proximity of the billboard, a vehicle with external speakers 320. In some embodiments, the vehicle may be equipped with a configurable horn. The media application may detect that the pedestrian is to the left of the billboard 310 and in front of the vehicle with external speakers 320. This spatial arrangement detection may be achieved through the combination of technologies shared between the billboard, vehicle, and any other the eligible devices and may include cameras, GPS, fiducial markers, lidar, sensors, and control circuitry for visual segmentation and pose reconstruction and any other suitable combination thereof. The media application may select supplemental content (e.g., audio based on the external speaker capability) related to the metadata of the billboard content. The media application may transmit the selected content to the vehicle with external speakers 320 to output the supplemental content 306, "Look to your right and up for information on pedestrian evacuation route," when the vehicle is in proximity to the pedestrian.

In some embodiments, an additional device, such as the pedestrian's smartphone, may be used in addition to the vehicle. For example, the pedestrian's smartphone, in emergency mode, plays the message, "The latest evacuation route is displayed to your right." Utilizing the eligible devices to supplement the exposure of a fixed device using spatial arrangement, such as the pedestrian's personal device, reduces infrastructure, cost, and maintenance as compared to integrating these technologies into one fixed device.

Figure 4:
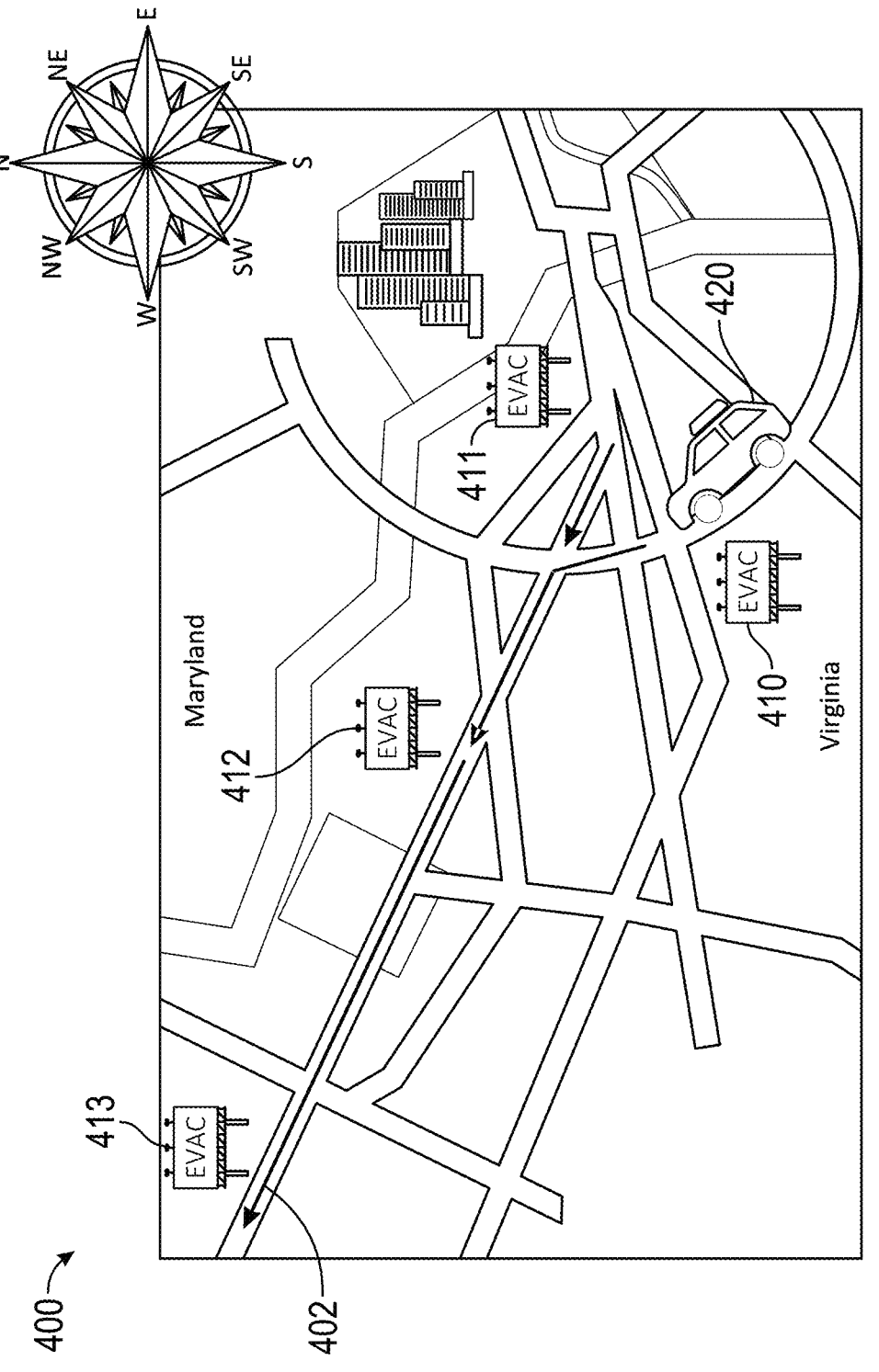
FIG. 4 depicts a schematic illustration of routing an eligible device by guiding it in proximity of each of the geo-stationary fixed devices, in accordance with some embodiments of the disclosure.

FIG. 4 depicts a schematic illustration 400 of routing an eligible device 420 (e.g., vehicle, smartphone, etc.) by guiding it in proximity of each of the geo-stationary fixed devices (e.g., 410, 411, 412, and 413), in accordance with some embodiments of the disclosure. For example, the primary content 301 displayed on fixed device 310 of FIG. 3 may correspond to the schematic illustration 400 of FIG. 4.

In some embodiments, multiple evacuation signs (e.g., 410, 411, 412, and 413) may display evacuation information along an evacuation route 402. Eligible devices (e.g. vehicles, smartphones, etc.) following the evacuation routes may be utilized to output additional supplemental content for evacuation-sign viewers nearby, for example through an emergency announcement app. For example, the system may detect changes in spatial arrangement of the vehicle 420 in relation to evacuation sign 410 that corresponds to the vehicle traveling northwest along the evacuation route and approaching evacuation sign 410. When vehicle 420 enters the media play area (e.g., 625 in FIG. 6), the system may transmit supplemental content and may cause the vehicle to output the content. For example, in FIG. 3, vehicle 320 outputs supplemental content 306 upon the media guidance application detecting a pedestrian 340 within proximity of a billboard 310 displaying emergency evacuation information 301. In the case of an evacuation route, vehicles may be rapidly entering and leaving the media play area of each evacuation sign. For example, referring to FIG. 6, the system may detect subsequent eligible devices (e.g., 620, 626, 627, and 628) entering and exiting the media play area 625 where a pedestrian 640 or pedestrians are detected and segment the supplemental content so that the subsequently passing vehicles play subsequent sections of the supplemental content (e.g., 606, 611, 612, and 613), thereby playing the full length of the content in proximity to the pedestrian using multiple vehicles. The system may determine the routing guidance of vehicle 420 based on minimizing the total distance traveled and maximizing the number of evacuation signs it will pass, thereby guiding the vehicle 420 to follow the evacuation route in the shortest distance feasible. For example, the next evacuation signs from vehicle 420 are evacuation sign 411 and evacuation sign 412. The system may calculate the total distance of choosing evacuation sign 411 as the next evacuation sign and the total distance of choosing evacuation sign 412 as the next evacuation sign. Based on comparing the total distance calculations, the system may determine that choosing evacuation sign 411 reduces the total distance while maximizing the number of evacuation signs the vehicle will pass. Therefore, the system will select navigational directions corresponding to the location of evacuation sign 411 for output by the navigation system of vehicle 420.

In some embodiments, the system may leverage multiple eligible devices. For example, the system may initially select general wildfire information to display on the geospatially fixed device. The system may identify, via a communication network (e.g., one or more networks including the internet, a mobile phone network, mobile voice or data network (e.g., a 5G, 4G, or LTE network), cable network, public switched telephone network, or other types of communication network or combinations of communication networks), a Federal Emergency Management Agency (FEMA) vehicle with dynamic car paint (e.g., 820 of FIG. 8) approaching a potential viewer who is facing away from the fixed device. The system generates supplemental visual content to be displayed on the body of the FEMA vehicle informing the viewer to "Look behind you for the latest wildfire information" (not shown). When the system detects that the potential viewer has turned around, it may use the device location reported to the emergency announcement app to selectively send the message to the potential viewer's mobile device, set to emergency mode, to indicate "For wildfire information, look up." While the system detects that the viewer is positioned and oriented in full line of sight, the fixed device may begin cycling through detailed information including wildfire boundary, safety zones, air quality, evacuation routes, road closures, wind direction, etc. The supplemental content in this scenario may also be adjusted for the number of potential viewers. For example, for multiple potential viewers, the body of the FEMA vehicle informing the viewers may instead state, "Wildfire information available on nearby billboard."

In some embodiments, the system may be applied in the absence of a dedicated fixed device. For example, a network of shelters (e.g., disaster relief shelters) may specify GPS locations for all of the shelter locations to enable supplemental devices to play content within a range of their locations to facilitate transmission of information to those in need.

Figure 5:
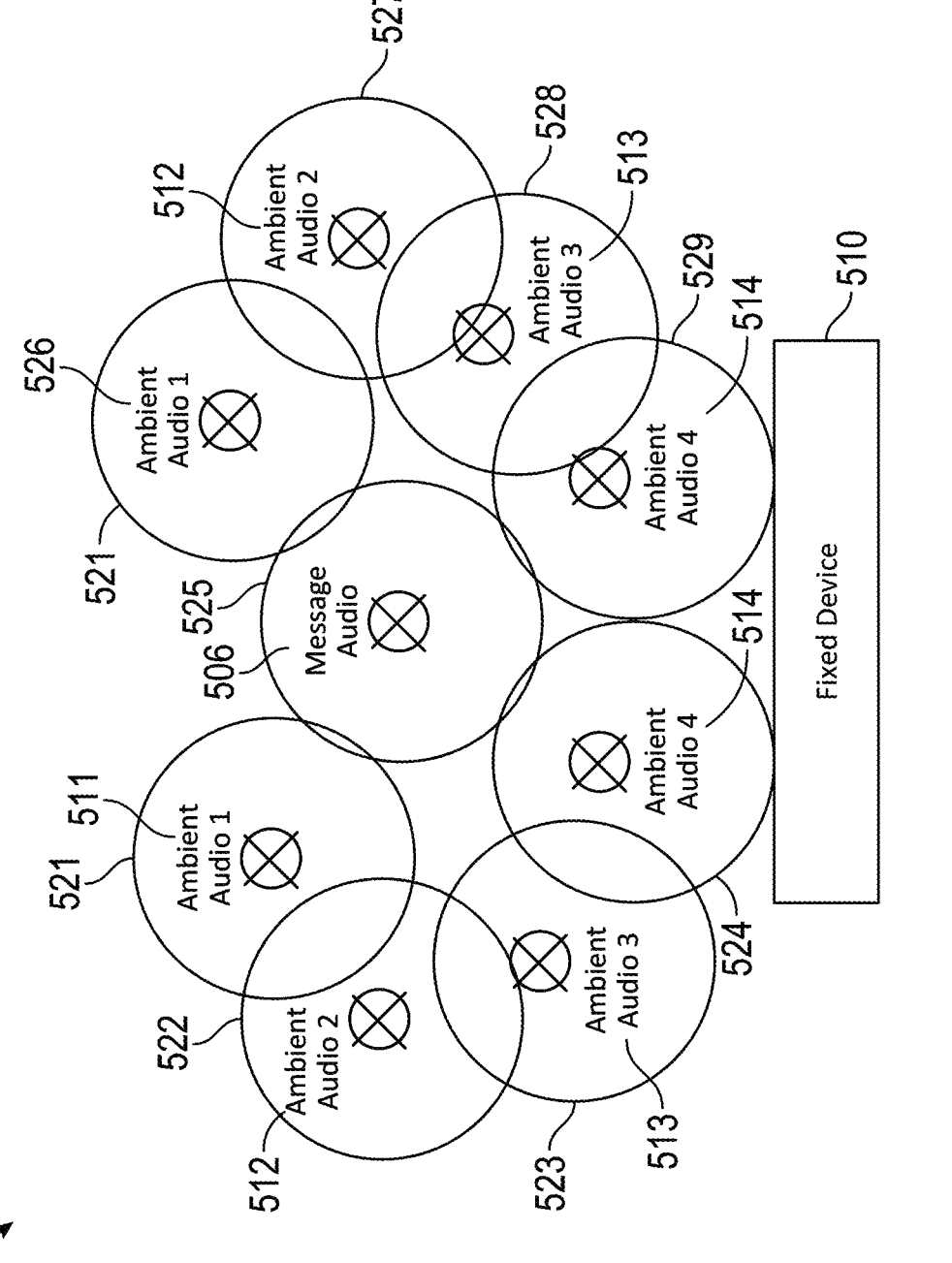
FIG. 5 depicts a schematic illustration of a media landscape comprising primary and supplemental media play areas, in accordance with some embodiments of the disclosure.

FIG. 5 depicts a schematic illustration of a media landscape 500 comprising primary and supplemental media play areas, in accordance with some embodiments of the disclosure.

In some embodiments, media landscape 500 (e.g., audio landscape) includes a primary media play area 525 and several secondary media play areas 521-524 and 526-529. For example, the system may cause one or more devices in the primary media play area to play message audio. For example, the system may cause one or more devices in the secondary media play areas 521-524 and 526-529 to play ambient audios 1-4 511, 512, 513, and 514 in symmetry around the primary media play area. For example, the system may cause one or more devices in the secondary media play areas 521-524 and 526-529 to play all different ambient audios or any combination of ambient audios allocated to secondary media play areas thereof. The system may be configured to locate the primary media play area 525 directly in front of the fixed device 510. The system may be configured to locate the secondary media play areas 521-524 and 526-529 to surround or be to be located relative to the primary media play area. The system may be configured to allow areas to overlap and/or share boundaries. The system may be configured to set areas in any shape for the media landscape.

In some embodiments, for example, the geospatially fixed device may lack audio capability. For example, the Mona Lisa in Le Louvre may be enhanced with audio supplemental content narrating about da Vinci's artwork. A media landscape 500 may be specified or determined around or with respect to the Mona Lisa, where the media landscape includes a primary media play area 525 that is central and one or more secondary media play areas 521-524 and 526-529 that are peripheral, all relative to the Mona Lisa (e.g., fixed device 510). The system may detect a viewer with a museum device (e.g., 120 of FIG. 1) entering secondary media play area 527 and may transmit ambient content about other Venetian paintings in the Salle des États gallery to the museum device for output. The system may further detect a viewer with a museum device (e.g., 120 of FIG. 1) entering primary media play area 525 and may transmit the narrative about da Vinci's artwork. The system may cause multiple museum devices to play simultaneously based on their location within the media landscape 500. For example, the devices located in the primary media play area 525 may play the Mona Lisa narrative (e.g., message audio 506) and the secondary media play areas 521-524 and 526-529 may play ambient content (e.g., ambient audio 511-514). The control circuitry (e.g., 1104 of FIGS. 11, 1211 of FIG. 12), running the media application, may assign priorities to the secondary media play areas 521-524 and 526-529. For example, the primary media play area 525 may be assigned a higher priority than the secondary media play areas 521-524 and 526-529. Based on the priority the media application may expand the primary media play area or convert ambient areas into primary media play areas.

In some embodiments, for example, the geospatially fixed device may display the video of a state of emergency declaration, but lacks audio capability. The fixed device may have a determined media landscape 500, where the media landscape includes a central primary media play area 525 and one or more peripheral secondary media play areas 521-524 and 526-529, all relative to the fixed device 510. Devices with outward-facing speakers, such as smartphones and vehicles, may simultaneously play content based on their location within the media landscape 500. For example, the devices located in the primary media play area 525 may play message audio 506 (e.g., the voice of the speaker) and the secondary media play areas 521-524 and 526-529 may play ambient audio 511-514 (e.g., tempered music or related news content). The control circuitry (e.g., 1104 of FIGS. 11, 1211 of FIG. 12), running the media application, may assign priorities to the secondary media play areas 521-524 and 526-529. For example, the primary media play area 525 may be assigned a higher priority than the secondary media play areas 521-524 and 526-529. Based on the priority, the media application may expand the primary media play area or convert ambient areas into primary media play areas.

In some embodiments, a fixed device 510 may request, on a publicly available API via a communication network, an audio landscape 500 from the system. The communication network may include one or more networks including the internet, a mobile phone network, mobile voice or data network (e.g., a 5G, 4G, or LTE network), cable network, public switched telephone network, or other types of communication network or combinations of communication networks. The API may return a set of coordinates that may be used to match the audio requirements to a media play area (e.g., 521-529) within the media landscape. For example, the system may assign mobile devices (e.g., 220 of FIG. 2, 320 of FIG. 3, etc.) with coordinates within a 30 meter radius message audio 506, and it may assign devices with coordinates between a 30 meter radius and a 60 meter radius ambient audio (e.g., 511-514). In a more generic case, the API may return a full audio landscape request consisting of a series of individual requests at individual coordinates. For example, the system may request various elements such as background music or ambient audio at select areas as well as elements of a voiced message at others.

In some embodiments, the device API may also return a timing element to synchronize mobile audio devices entering and leaving an area where audio is requested. For example, a first mobile device entering a location may query the API and the API returns a need for an audio clip to be played back at that location. The first mobile device may then play the clip and send confirmation to the system that the audio was played. A second mobile device may also query the API at a later date, but while the first mobile device is still playing the audio clip, and the API may return time shift information to the second mobile device so that it may start playing back the audio clip sufficiently in sync with the first mobile device. The device may detect that a first mobile device has started playing a first audio clip but has moved away from a first media play area. The device may then assign a second mobile device playing a second clip in a second media play area that is now closer to the center of the first media play area than the first mobile device to start playing the first audio clip. For example, the system may detect that no mobile device is playing message audio 506 and may then reassign a mobile device playing ambient audio 4 514 to start playing message audio 506.

In some embodiments, devices playing private audio, such as through an audio headset or AR headset, may play the media content of the primary media play area 525 regardless of their location within the media landscape 500. Devices entering the media landscape may be synchronized to play in time with the timestamp of the visual content of the fixed device. In some embodiments, additional devices may be recruited to enter the media play area to play the message audio. These devices may play the content simultaneously (e.g., process 1500 or 1550 of FIG. 15) or in sequence (e.g., process 1600 of FIG. 16) depending on each device's location and trajectory into, within, and exiting the media play area.

In some embodiments, upon the system detecting a fixed device 510 without the capability of broadcasting a request for an audio device, an eligible device may broadcast a signal (e.g., radio frequency, Bluetooth, Wi-Fi) to indicate the presence of a nearby fixed device 510. The system may detect a second eligible audio device that is within range of the fixed device 510 but that is not in line of sight to it, based on using the eligible device to scan the environment to derive the spatial position of the second device. The system may accomplish this process using shared spatial markers or other techniques known in the art. For example, a device in front of the fixed device 510 may have clear line of sight to a fiducial marker on the fixed device and detect environmental spatial anchors surrounding the fixed device 510. An eligible device behind the fixed device 510 may not have line of sight to the fixed device 510 but may determine its proximity and relative position to the fixed device 510 based on detecting spatial anchors shared with the first device.

Figure 6:
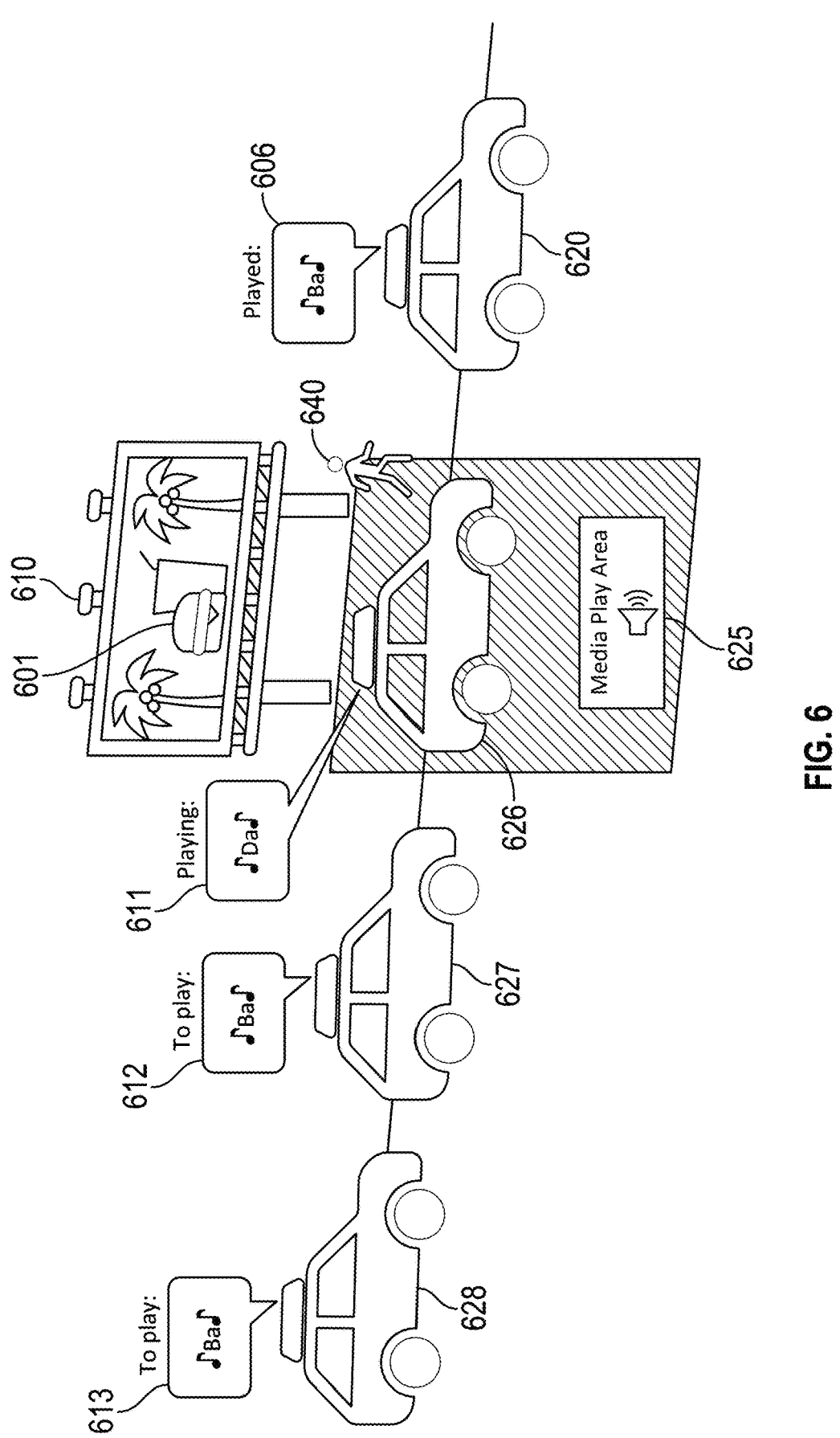
FIG. 6 depicts a schematic illustration of playing portions of audio content sequentially on mobile devices, in accordance with some embodiments of the disclosure.

FIG. 6 depicts a schematic illustration of playing portions of audio content (e.g., 606, 611, 612, and 613) sequentially on mobile devices (e.g., 620, 626, 627, and 628, respectively) in accordance with some embodiments of the disclosure.

In some embodiments, the system relies on hardware integrated with the supplemental audio device for sensing (e.g., cameras, lidar) and output (e.g., directional speakers). For example, billboard 610 displaying content 601 relies on passing mobile devices (e.g., smartphones, vehicles, etc.) for sensing and output of supplemental content. The system may identify available media devices in vicinity of media play area (e.g., 1704 of FIG. 17) that have eligible capabilities that meet the advertisement requirements. Given the range of hardware found in audio devices, all audio devices will not be able to perform all sensing and output for every ad. For example, each mobile device will have its own set of requirements for sensing and output, which may be accessed via an API call triggered via device proximity, fiducial marker, or GPS coordinates. In some embodiments, the system may follow the process outlined in FIG. 17 for sequencing and assigning audio segments (e.g., 606, 611, 612, and 613) to be played in a media play area (e.g., 625).

In some embodiments, the system may select or present a route that maximizes the number of ads a device navigating toward a destination can enhance by providing supplemental content. For example, the system may determine appropriate devices or a sufficient number of devices to select or route based on ad requirements (e.g., 1706 of FIG. 17). For example, if the system does not identify appropriate devices or a sufficient number of devices, the system may route available distant media devices to media play area (e.g., 1708 of FIG. 17). For example, the system may detect a car with front-facing exterior car speakers and may select supplemental content by playing supplemental audio as it passes a billboard 610 displaying an out-of-home (OOH) advertisement 601 requiring audio supplemental content. For example, the system may detect a car with directional exterior speakers that may guide audio toward users as it passes by The system may select supplemental content that corresponds to directional exterior speaker capability as it passes a billboard 610 displaying an out-of-home (OOH) advertisement 601 requiring audio supplemental content. For example, the system may detect a car with dynamic car paint (e.g., 820 of FIG. 8) and may select supplemental content by causing it to change its car paint pattern (e.g., 806 of FIG. 8) as it passes a billboard 610 displaying an out-of-home (OOH) advertisement 601 requiring visual supplemental content.

Figure 17:
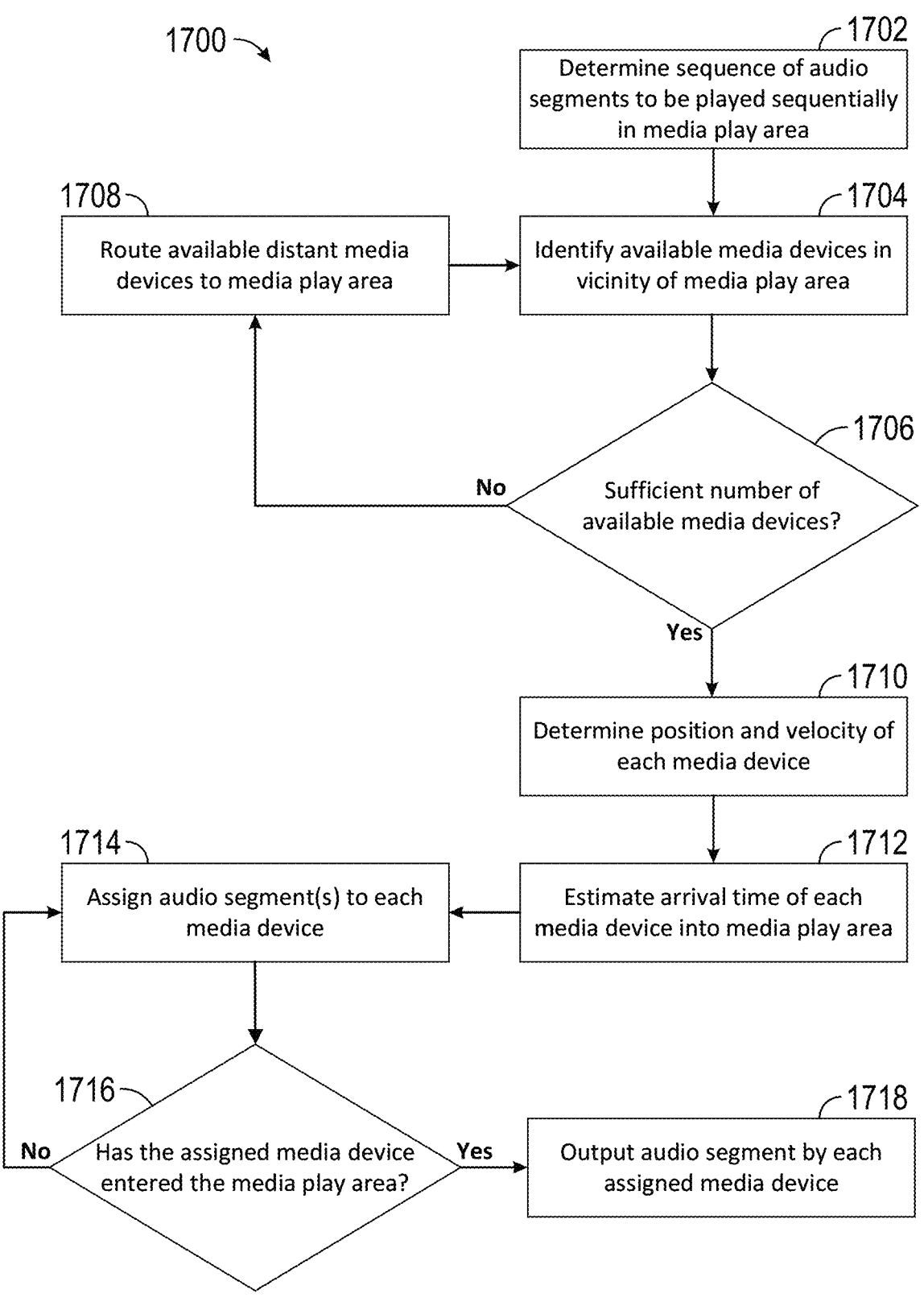
FIG. 17 depicts a flowchart of a process for sequencing and assigning audio segments to be played in a media play area, in accordance with some embodiments of this disclosure.

In some embodiments, more than one mobile audio device (e.g., smartphones, vehicles, etc.) may be routed to transect a media play area 625 (e.g., 1708 of FIG. 17). For example, the system may route vehicles 620, 626, 627, and 628 to play supplemental content for billboard 610. In some embodiments, the system may select vehicles that are currently located within a media play area 625 to play supplemental content for billboard 610. The system may determine a sequence of audio segments (e.g., 606, 611, 612, and 613) to be played sequentially in the media play area 625 (e.g., 1702 of FIG. 17). The system may use each media device's detected position and velocity to estimate an arrival time for each media device (e.g., 620, 626, 612, and 613) to transit the media play area (e.g., 625) and assign audio segment(s) (e.g., 606, 611, 612, and 613) to each media device according to the estimated time of arrival (e.g., 1710, 1712, and 1714 of FIG. 17). The system may detect that a vehicle 620 selected to play a first audio clip 606 upon entering the media play area 625 may expose pedestrian 640 (or pedestrians) in close proximity to the billboard 610 for only a short period of time (such as a duration shorter than the duration of the selected audio clip). The system may identify and route additional vehicles (e.g., 626, 627, and 628) to transect the media play area 625 shortly after the first vehicle 620 transects it and instruct them to play the same clip potentially at a later starting point. In some embodiments, the system may cause the media device to play the assigned audio segment at the estimated time of arrival. In some embodiments, the system may detect the assigned media device is located within the media play area (e.g., 626) and cause the media device to play the assigned audio segment (e.g., 1718 of FIG. 17). In some embodiments, the system may redundantly assign or reassign audio segments if the system detects the assigned media device has not entered the media play area (e.g., 1716 of FIG. 17).

In another embodiment, the system may identify and route a plurality of mobile audio devices to a media play area and generate a varying media landscape (e.g., 500) indexed on the speed at which the mobile devices transect the media play area. The system may identify, select, and transmit supplemental content to mobile devices according to embodiments in FIGS. 15A, 15B, and 16. For example, the system may decide to play a jingle to supplement an OOH ad 601 that is composed of five notes. The system may route a first mobile audio device 620 to play the first note 606 of the jingle, a second mobile audio device 626 to play the second note 611 of the jingle and so on with a third, fourth and fifth mobile audio device. The resulting effect of the system would be the ability to play the totality of the jingle as the mobile audio devices enter and leave the media play area 625 where the pedestrians 640 are located.

Figure 7:
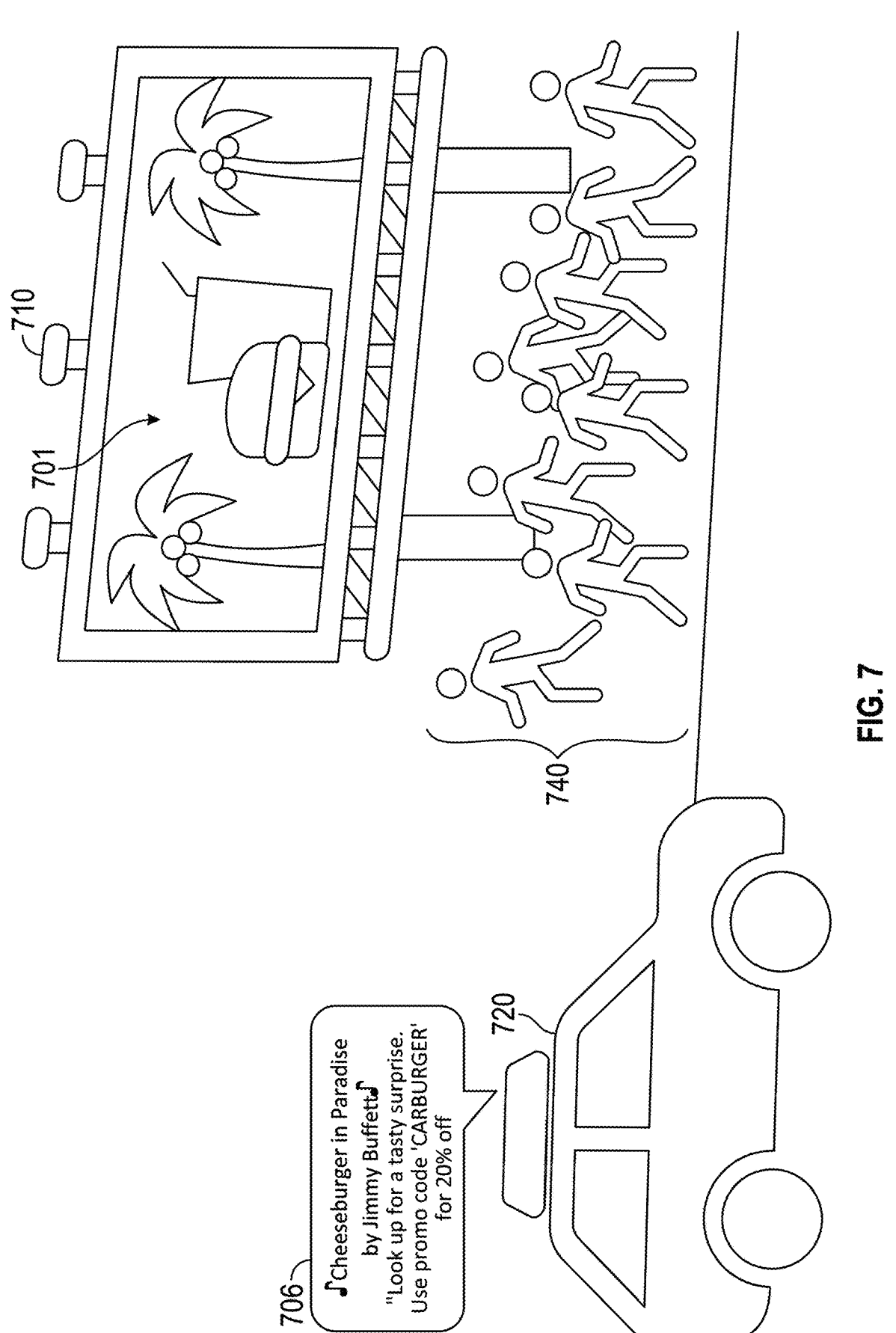
FIG. 7 depicts a schematic illustration of selecting supplemental content based on the number of potential viewers, in accordance with some embodiments of the disclosure.

FIG. 7 depicts a schematic illustration of selecting supplemental content 706 based on the number of potential viewers 740, in accordance with some embodiments of the disclosure.

In some embodiments, the system may use eligible devices (e.g., smartphones, autonomous vehicles) to detect potential viewers 740 of an out-of-home (OOH) advertisement 701 and their spatial arrangement relative to the ad display 710 (e.g., the ad is above viewers, the viewers have line of sight of the ad, the viewers are facing the ad, etc.) and eligible devices (e.g., 720). The system may select an ad version based on the spatial arrangement of detected ad viewers 740 and eligible nearby devices relative to the ad. For example, vehicle with external speakers 720 may be a detected device with eligible capabilities within range of the ad display 710, and the system may transmit selected supplemental content 706 to play from the external speaker. The system may monitor and modify the supplemental content 706 or primary advertisement 701 based on changes to those spatial features of ad viewers and supplemental devices. The system may recruit or route additional devices to a media play area, for example as depicted in FIG. 6, to play supplemental content. Supplemental content for the advertisement 701 may be audio or visual media based on detected eligible device capabilities (e.g., speakers, displays, etc.). For example, eligible devices capabilities may include any device capabilities that may enhance an advertisement (e.g., visual projectors, dynamic car paint, directional speakers).

Figure 8:
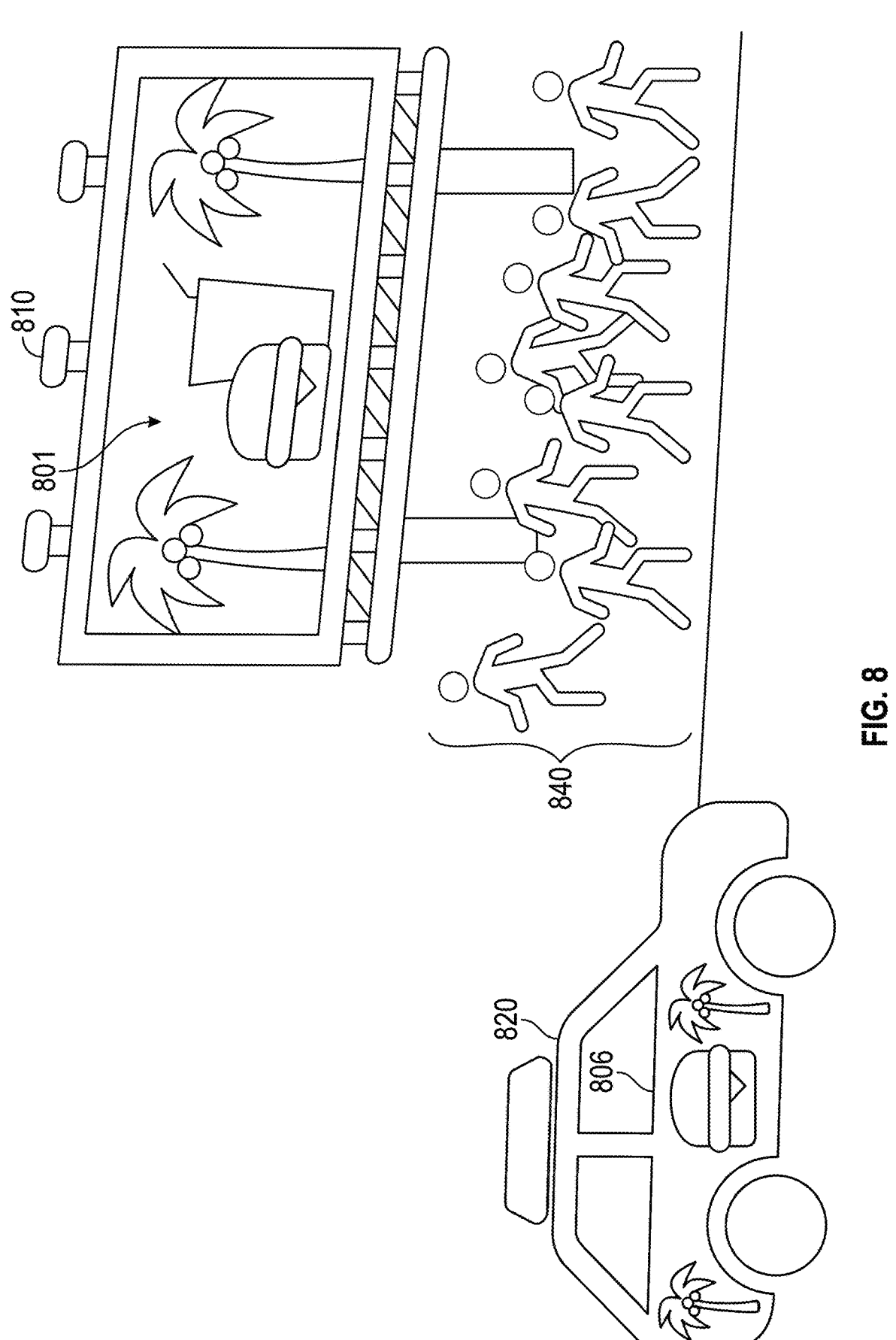
FIG. 8 depicts a schematic illustration of displaying supplemental content using dynamic car paint of a mobile device, in accordance with some embodiments of the disclosure.

In some embodiments, an advertisement may include alternate versions intended for different numbers of viewers 740. Such alternate versions may be activated based on the detected number of users within proximity of or within line of sight of an OOH ad. For example, an OOH ad version intended for a single user may point a finger at the single user and display "Hey you! Yeah you! Come check out this sale." The version intended for multiple users may contain more generic language such as "Don't you love a good sale? Come check this one out." FIG. 8 depicts a schematic illustration of displaying supplemental content 806 using dynamic car paint of a mobile device 820, in accordance with some embodiments of the disclosure.

In some embodiments, digital out-of-home (DOOH) advertisements may include video content. Supplemental devices may identify the timestamp of the video via an API call or image recognition and play supplemental content synced to the DOOH video. For example, a car with dynamic car paint 820 may change its car paint pattern 806 to match a DOOH company logo when it flashes at the end of an advertisement 801. Similarly, supplemental audio devices may play audio synced with a character speaking in an ad or play an ad jingle when the company logo is displayed. Some eligible devices may be able to sync both audio and visual content. The DOOH ad may include alternate versions intended for different numbers of viewers 840.

In some embodiments, the system preference may be set using a viewer's orientation relative to the ad (e.g., the ad is behind them) to deliver alternate versions of the ad: "Look behind you for a delicious surprise" (if behind) or "In case you're wondering, yes, it tastes as delicious as it looks" (if in front). If no available supplemental devices have an accessible camera, the system may fall back on a supplemental audio or visual ad that relies on simple device proximity to the ad: "So much deliciousness is easy to spot even from this far away." An advertisement for a brick-and-mortar store may provide supplemental devices with a specific location (e.g., the nearest store) that may be presented contextually based on detected spatial arrangement: "Looks good, doesn't it? You can get one 200 feet behind you."

Figure 9:
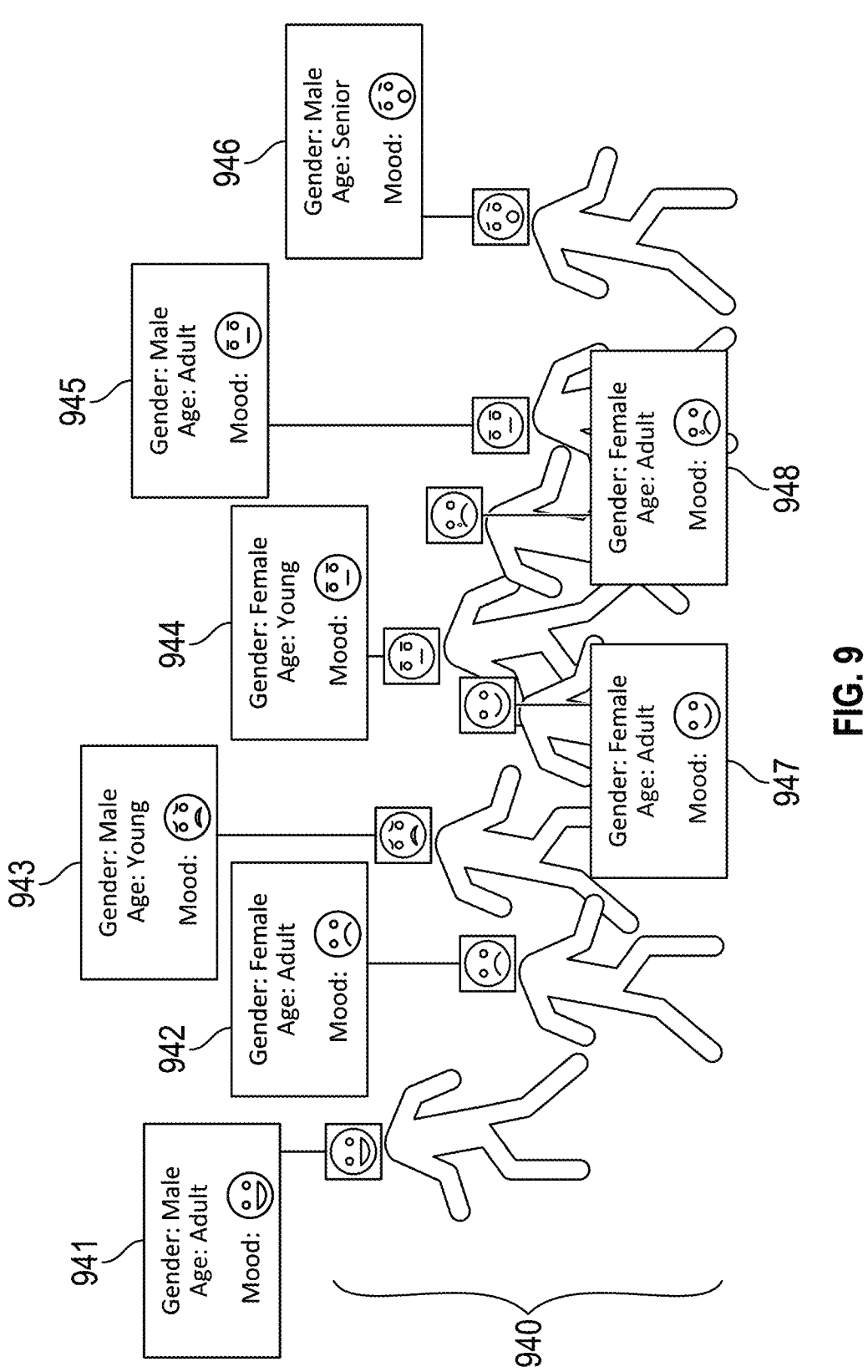
FIG. 9 depicts a schematic illustration of detecting potential viewers' characteristics, in accordance with some embodiments of the disclosure.

FIG. 9 depicts a schematic illustration of detecting potential viewers' 940 characteristics, in accordance with some embodiments of the disclosure.

In some embodiments, the system may utilize enrolled personal devices (e.g., smartphones, smart watches, smart glasses, smart rings, fitness trackers, etc.) to determine potential viewers' 940 characteristics to generate personalized supplemental content. For example, an enrolled personal device may provide physiological data (e.g., heart rate, electrocardiogram (EKG), blood oxygen level, sleep patterns, physical activity, blood pressure, body temperature, heart hate variability (HRV), etc.) to the system. For example, during an evacuation, the system may access heart rate data from enrolled smart watches to assess the pace and panic level of pedestrians and supplement the evacuation message on the billboard (e.g., 310 of FIG. 3) with voice messages on the users smartphones to remain calm and proceed in an orderly manner as quickly as possible. For example, for a food advertisement (e.g., 701 of FIG. 7), the system may access physical activity data of a user's enrolled fitness tracker and supplement the food advertisement with audio stating: "Great work! You've earned this Burger!"

For example, the system may utilize technologies such as demographic and mood recognition to personalize content. For example, the system may use cameras to detect users and select supplemental content based on detected features 941-946 and 948, such as age, gender, and mood, or may detect objects such as the make and model of cars that drive by the fixed device. Cameras integrated into the fixed device or supplemental devices may also be used by the system to detect ad viewers via existing human segmentation techniques. This process involves capturing an image, running segmentation (locally or via cloud API), and identifying human forms. Such techniques may identify the number and positions of any potential ad viewers within a given range of a fixed device. For example, a camera may detect pedestrian 947 with a happy mood and display on a billboard (e.g., 610 of FIG. 6, 710 of FIG. 7, and 810 of FIG. 8) an advertisement stating, "Nothing goes better with happiness than a burger in paradise!"

In some embodiments, a priority audio clip (e.g., 506 of FIG. 5) may be adapted to a detected mobile device (e.g., smartphones, vehicles, etc.). Targeting and personalization methods known in the art may be adapted to this particular use case to alter or select an audio message based on a known user profile (such as one stored in the mobile device and appended as metadata in the API call). The system may therefore provide a limited form of programmatic digital out of home advertisement (pDOOH) without having to redesign an OOH ad device such as a billboard (e.g., 610 of FIGS. 6, 710 of FIG. 7, and 810 of FIG. 8).

In an embodiment, the system may leverage an identified user device to source and render content for the content display, in addition to using its display and speakers. For example, the system may request to source photos/video from the user device and generate a new visual presentation for display on the fixed device or the user device, which is contextual and personalized for a more engaging content experience. The addition of visual elements to the creation and rendering is not limited to requesting access to the user device's stored photos. For example, targeted content may be generated through tracking user behavior and purchase history and collecting personal data, device data, and location data. User behavior includes browsing history (websites visited, links clicked), search queries, time spent on certain pages, and interactions with content and may be tracked using cookies, web beacons, and other tracking technologies. Personal data may include age, gender, location, and interests, which may be collected from social media accounts. The system may use this information to request media familiar to the user (e.g., a photo of friends, a photo of pets, etc.) and generate content for display on the fixed device or the user device.

In another embodiment, the system may leverage on device rendering (e.g., on smartphones, AR/XR devices, etc.), which has the advantage of better privacy protection of user data. For example, the personal content, prior to the rendering, does not have to be distributed. In one embodiment, the rendering and display of final visual may also be spatially distributed among devices, in the case of multiple users. For example, the system may have each device create a new visual (e.g., images, short videos) and then aggregate them on the ad display. The presentation of multiple images and videos may be varied based on ad preferences and contextual factors. A more sophisticated method may have a final visual that includes one or more of the multiple users through techniques such as compositing or AI-based blending. The system may enable rendering of personal voice/audio to associate with each individual visual that is rendered on device. In one embodiment, the system may push generated content, which is personalized and engaging, to the user's device for sharing with others through social media.

Figure 10:
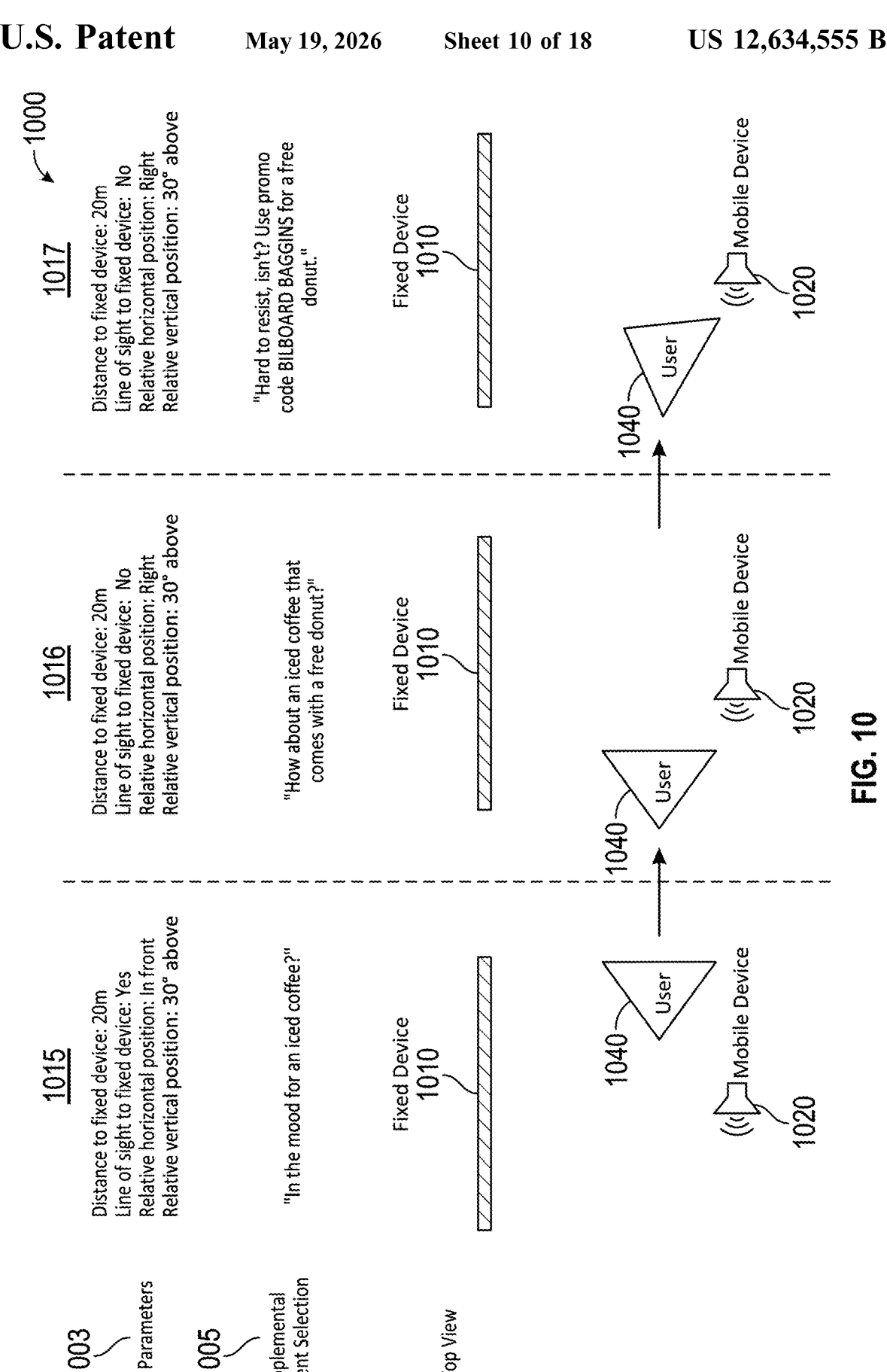
FIG. 10 depicts a schematic illustration of selecting sequential supplemental content based on spatial arrangement, in accordance with some embodiments of the disclosure.

FIG. 10 depicts schematic illustration 1000 of selecting sequential supplemental content selection 1005 based on spatial arrangement, in accordance with some embodiments of the disclosure.

In one embodiment, the system may program an OOH advertisement in a sequential branching structure that changes ad content based on user response. For example, in scenario 1015, a user 1040 walking past an OOH ad on fixed device 1010 may hear a neutral audio supplement from an identified supplemental mobile device 1020 such as "In the mood for an iced coffee?" The audio device may identify and notify the system that the user has continued walking in scenario 1016. The system may then play audio meant to entice an unresponsive user: "How about an iced coffee that comes with a free donut?" The audio device may then identify and notify the system that the user has turned to face the fixed device 1010 in scenario 1017. The system may identify this as a positive response and play audio containing the promised promotion and referencing previously observed behavior (e.g., ignoring the first supplemental audio): "Hard to resist, isn't it? Use promo code BILBOARD BAGGINS for a free donut."

FIG. 11 depicts an illustrative user equipment 1100 and 1101, in accordance with some embodiments of this disclosure. For example, user equipment 1100 may be a smartphone device equipped with audio output equipment 1114, visual display 1112, user input interface 1110, memory storage 1108, processing circuitry 1106, control circuitry 1104, input/output (I/O) path 1102, camera 1119, and microphone 1116. In another example, user equipment 1101 may be a user television equipment system or device. User equipment 1101 may include set-top box 1115. Set-top box 1115 may be communicatively connected to microphone 1116, audio output equipment 1114 (e.g., speaker or headphones), and display 1112. In some embodiments, microphone 1116 may receive audio corresponding to a voice of a user and/or ambient audio data. In some embodiments, display 1112 may be a television display or a computer display. In some embodiments, set-top box 1115 may be communicatively connected to user input interface 1110. In some embodiments, user input interface 1110 may be a remote-control device. Set-top box 1115 may include one or more circuit boards. In some embodiments, the circuit boards may include control circuitry 1104, processing circuitry 1106, and storage 1108 (e.g., RAM, ROM, hard disk, removable disk, etc.). In some embodiments, the circuit boards may include an input/output path 1102.

Each one of user equipment 1100 and user equipment 1101 may receive content and data via input/output (I/O) path 1102. I/O path 1102 may provide supplemental content (e.g., audio or visual media) and data to control circuitry 1104, which may comprise processing circuitry 1106 and storage 1108. Control circuitry 1104 may be used to send and receive commands, requests, and other suitable data using I/O path 1102, which may comprise I/O circuitry. While set-top box 1115 is shown in FIG. 11 for illustration, any suitable computing device having processing circuitry, control circuitry, and storage may be used in accordance with the present disclosure. For example, set-top box 1115 may be replaced by, or complemented by, a personal computer (e.g., a notebook, a laptop, a desktop), a smartphone (e.g., user equipment 1100), an XR device, a tablet, a network-based server hosting a user-accessible client device, a non-user-owned device, any other suitable device, or any combination thereof.

Control circuitry 1104 may be based on any suitable control circuitry such as processing circuitry 1106. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 1104 executes instructions for the system (as described in connection with FIGS. 1-3) stored in memory (e.g., storage 1108). Specifically, control circuitry 1104 may be instructed by the system to perform the functions discussed above and below. In some implementations, processing or actions performed by control circuitry 1104 may be based on instructions received from the system.

In client/server-based embodiments, control circuitry 1104 may include communications circuitry suitable for communicating with a server or other networks or servers. The system may be a stand-alone application implemented on a device or a server. The application may be implemented as software or a set of executable instructions. The instructions for performing any of the embodiments discussed herein of the application may be encoded on non-transitory computer-readable media (e.g., a hard drive, random-access memory on a DRAM integrated circuit, read-only memory on a BLU-RAY disk, etc.). For example, in FIG. 11, the instructions may be stored in storage 1108, and executed by control circuitry 1104 of a user equipment 1100.

In some embodiments, the application may be a client/server application where only the client application resides on user equipment 1100, and a server application resides on an external server (e.g., server 1204 and/or media content source 1202). For example, the application may be implemented partially as a client application on control circuitry 1104 of user equipment 1100 and partially on server 1204 as a server application running on control circuitry 1211. Server 1204 may be a part of a local area network with one or more of user equipment 1100, 1101 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 1204 and/or an edge computing device), referred to as "the cloud." User equipment 1100 may be a cloud client that relies on the cloud computing capabilities from server 1204 to generate personalized supplemental content.

Control circuitry 1104 may include communications circuitry suitable for communicating with a server, edge computing systems and devices, a table or database server, or other networks or servers. The instructions for carrying out the above-mentioned functionality may be stored on a server (which is described in more detail in connection with FIG. 12). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the internet or any other suitable communication networks or paths (which is described in more detail in connection with FIG. 12). In addition, communications circuitry may include circuitry that enables peer-to-peer communication of user equipment, or communication of user equipment in locations remote from each other (described in more detail below).

Memory may be an electronic storage device provided as storage 1108 that is part of control circuitry. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 1108 may be used to store various types of content described herein as well as application data described above. Nonvolatile memory may also be used (e.g., to launch a boot-up routine and other instructions). Cloud-based storage, described in relation to FIG. 11, may be used to supplement storage 1108 or instead of storage 1108. Non-transitory memory may store instructions that, when executed by control circuitry, I/O circuitry, any other suitable circuitry or combination thereof, executes functions of an application as described above.

Control circuitry 1104 may include video generating circuitry and tuning circuitry, such as one or more analog tuners, one or more MPEG-2 decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 1104 may also include scaler circuitry for upconverting and downconverting content into the preferred output format of user equipment 1100. Control circuitry 1104 may also include digital-to-analog converter circuitry and analog-to-digital converter circuitry for converting between digital and analog signals. The tuning and encoding circuitry may be used by user equipment 1100 and 1101 to receive and to display, to play, or to record content. The tuning and encoding circuitry may also be used to receive video communication session data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1108 is provided as a separate device from user equipment 1100, the tuning and encoding circuitry (including multiple tuners) may be associated with storage 1108.

Control circuitry 1104 may receive instruction from a user by way of user input interface 1110. User input interface 1110 may be any suitable user interface, such as a remote control, mouse, trackball, keypad, keyboard, touch screen, touchpad, stylus input, joystick, voice recognition interface, or other user input interfaces. Display 1112 may be provided as a stand-alone device or integrated with other elements of each one of user equipment 1100 and user equipment 1101. For example, display 1112 may be a touchscreen or touch-sensitive display. In such circumstances, user input interface 1110 may be integrated with or combined with display 1112. In some embodiments, user input interface 1110 includes a remote-control device having one or more microphones, buttons, keypads, any other components configured to receive user input or combinations thereof. For example, user input interface 1110 may include a handheld remote-control device having an alphanumeric keypad and option buttons. In a further example, user input interface 1110 may include a handheld remote-control device having a microphone and control circuitry configured to receive and identify voice commands and transmit information to set-top box 1115.

Audio output equipment 1114 may be integrated with or combined with display 1112. Display 1112 may be one or more of a monitor, television, liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 1112. Audio output equipment 1114 may be provided as integrated with other elements of each one of user equipment 1100 and user equipment 1101 or may be stand-alone units. An audio component of videos and other content displayed on display 1112 may be played through speakers (or headphones) of audio output equipment 1114. In some embodiments, audio may be distributed to a receiver (not shown), which processes and outputs the audio via speakers of audio output equipment 1114. In some embodiments, for example, control circuitry 1104 is configured to provide audio cues to a user, or other audio feedback to a user, using speakers of audio output equipment 1114. There may be a separate microphone 1116 or audio output equipment 1114 may include a microphone configured to receive audio input such as voice commands or speech. For example, a user may speak letters or words that are received by the microphone and converted to text by control circuitry 1104. In a further example, a user may voice commands that are received by a microphone and recognized by control circuitry 1104. Camera 1118 may be any suitable video camera integrated with the equipment or externally connected. Camera 1118 may be a digital camera comprising a charge-coupled device (CCD) and/or a complementary metal-oxide semiconductor (CMOS) image sensor. Camera 1118 may be an analog camera that converts to digital images via a video card.

The application may be implemented using any suitable architecture. For example, it may be a stand-alone application wholly implemented on each one of user equipment 1100 and user equipment 1101. In such an approach, instructions of the application may be stored locally (e.g., in storage 1108), and data for use by the application is downloaded on a periodic basis (e.g., from an out-of-band feed, from an internet resource, or using another suitable approach). Control circuitry 1104 may retrieve instructions of the application from storage 1108 and process the instructions to provide video conferencing functionality and generate any of the displays discussed herein. Based on the processed instructions, control circuitry 1104 may determine what action to perform when input is received from user input interface 1110. For example, movement of a cursor on a display up/down may be indicated by the processed instructions when user input interface 1110 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, random access memory (RAM), etc.

Control circuitry 1104 may allow a user to provide user profile information or may automatically compile user profile information. For example, control circuitry 1104 may access and monitor network data, video data, audio data, processing data, content consumption data, and/or any other suitable data being accessed by a first user (e.g., user 140 of museum device 120). Control circuitry 1104 may obtain all or part of other user profiles that are related to a particular user (e.g., via social media networks), and/or obtain information about the user from other sources that control circuitry 1104 may access. As a result, a user may be provided with a unified experience across the user's different devices.

In some embodiments, the application is a client/server-based application. Data for use by a thick or thin client implemented on each one of user equipment 1100 and user equipment 1101 may be retrieved on demand by issuing requests to a server remote to each one of user equipment 1100 and user equipment 1101. For example, the remote server may store the instructions for the application in a storage device. The remote server may process the stored instructions using circuitry (e.g., control circuitry 1104) and generate the displays discussed above and below. The user equipment may receive the displays generated by the remote server and may display the content of the displays locally on user equipment 1100. This way, the processing of the instructions is performed remotely by the server while the resulting displays (e.g., that may include text, a keyboard, or other visuals) are provided locally on user equipment 1100. User equipment 1100 may receive inputs from the user via user input interface 1110 and transmit those inputs to the remote server for processing and generating the corresponding displays. For example, user equipment 1100 may transmit a communication to the remote server indicating that an up/down button was selected via user input interface 1110. The remote server may process instructions in accordance with that input and generate a display of the application corresponding to the input (e.g., a display that moves a cursor up/down). The generated display is then transmitted to user equipment 1100 for presentation to the user.

In some embodiments, the application may be downloaded and interpreted or otherwise run by an interpreter or virtual machine (run by control circuitry 1104). In some embodiments, the application may be encoded in the ETV Binary Interchange Format (EBIF), received by control circuitry 1104 as part of a suitable feed, and interpreted by a user agent running on control circuitry 1104. For example, the application may be an EBIF application. In some embodiments, the application may be defined by a series of JAVA-based files that are received and run by a local virtual machine or other suitable middleware executed by control circuitry 1104. In some of such embodiments (e.g., those employing MPEG-2, MPEG-4, HEVC or any other suitable digital media encoding schemes), the application may be, for example, encoded and transmitted in an MPEG-2 object carousel with the MPEG audio and video packets of a program.

Figure 12:
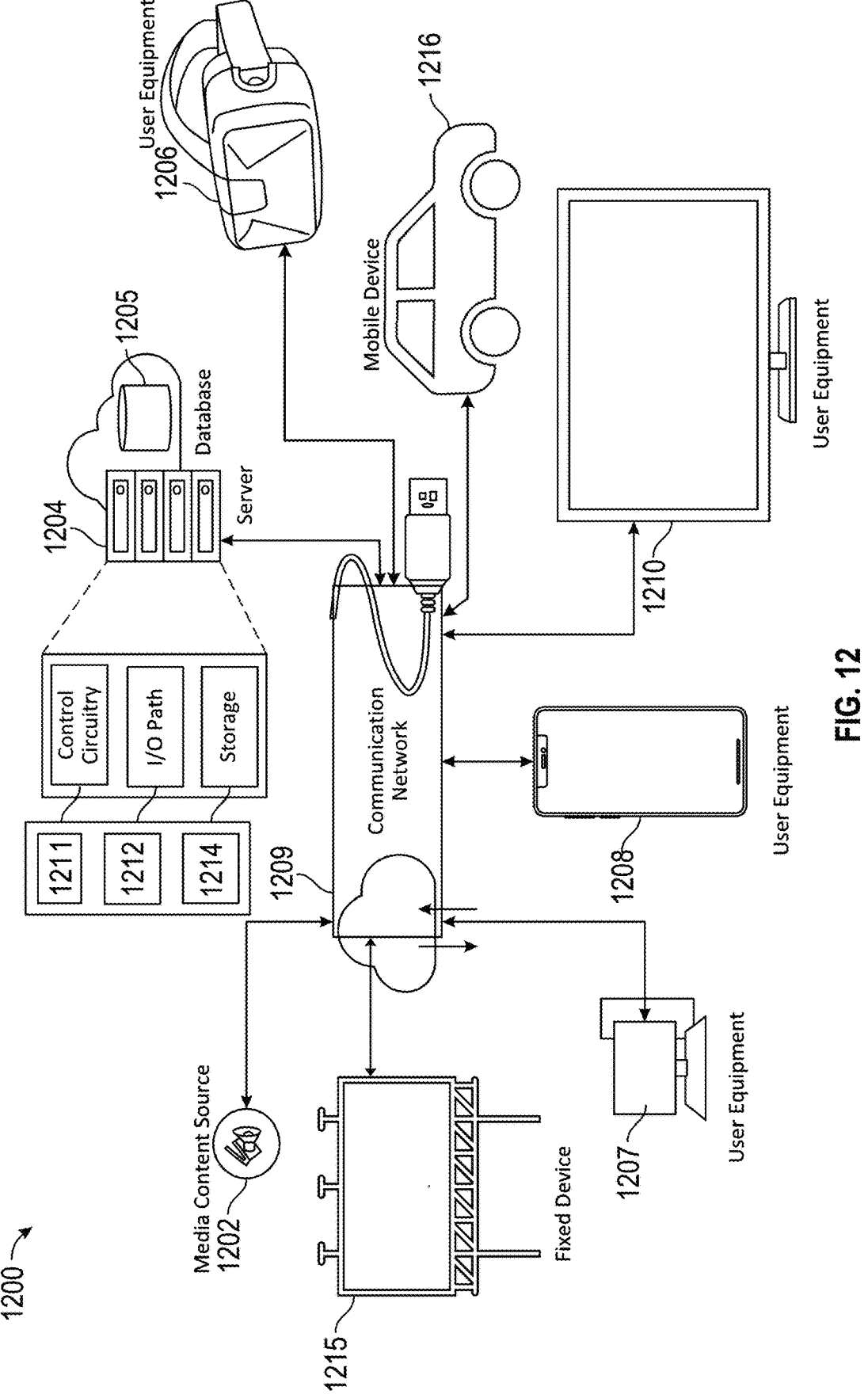
FIG. 12 depicts an illustrative user equipment system, in accordance with some embodiments of this disclosure.

FIG. 12 depicts an illustrative user equipment system, in accordance with some embodiments of this disclosure. In some embodiments, user equipment 1206, 1207, 1208, and 1210, fixed device 1215, and mobile device 1216 may be coupled to communication network 1209. Communication network 1209 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 1209) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the user equipment may be provided by one or more of these communications paths but are shown as a single path in FIG. 12 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 1209.

System 1200 may comprise media content source 1202, one or more servers 1204, and/or one or more edge computing devices. In some embodiments, the application may be executed at one or more of control circuitry 1211 of server 1204 (and/or control circuitry of user equipment 1206, 1207, 1208, 1210 and/or control circuitry of one or more edge computing devices). In some embodiments, the media content source and/or server 1204 may be configured to host or otherwise facilitate video communication sessions between user equipment 1206, 1207, 1208, 1210 and/or any other suitable user equipment, and/or host or otherwise be in communication (e.g., over communication network 1209) with one or more social network services.

In some embodiments, server 1204 may include control circuitry 1211 and storage 1214 (e.g., RAM, ROM, Hard Disk, Removable Disk, etc.). Storage 1214 may store one or more databases 1205. Non-transitory memory may store instructions that, when executed by control circuitry, I/O circuitry, any other suitable circuitry or combination thereof, executes functions of an application as described above. Server 1204 may also include an I/O path 1212. In some embodiments, I/O path 1212 may be an I/O circuitry. I/O circuitry may be a NIC card, audio output device, mouse, keyboard card, any other suitable I/O circuitry device or combination thereof. I/O path 1212 may provide video conferencing data, device information, or other data, over a local area network (LAN) or wide area network (WAN), and/or other content and data to control circuitry 1211, which may include processing circuitry, and storage 1214. Control circuitry 1211 may be used to send and receive commands, requests, and other suitable data using I/O path 1212, which may comprise I/O circuitry. I/O path 1212 may connect control circuitry 1211 to one or more communications paths.

Control circuitry 1211 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 1211 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 1211 executes instructions for an emulation system application stored in memory (e.g., the storage 1214). Memory may be an electronic storage device provided as storage 1214 that is part of control circuitry 1211. Memory may store instruction to run the application.

Figure 13A:
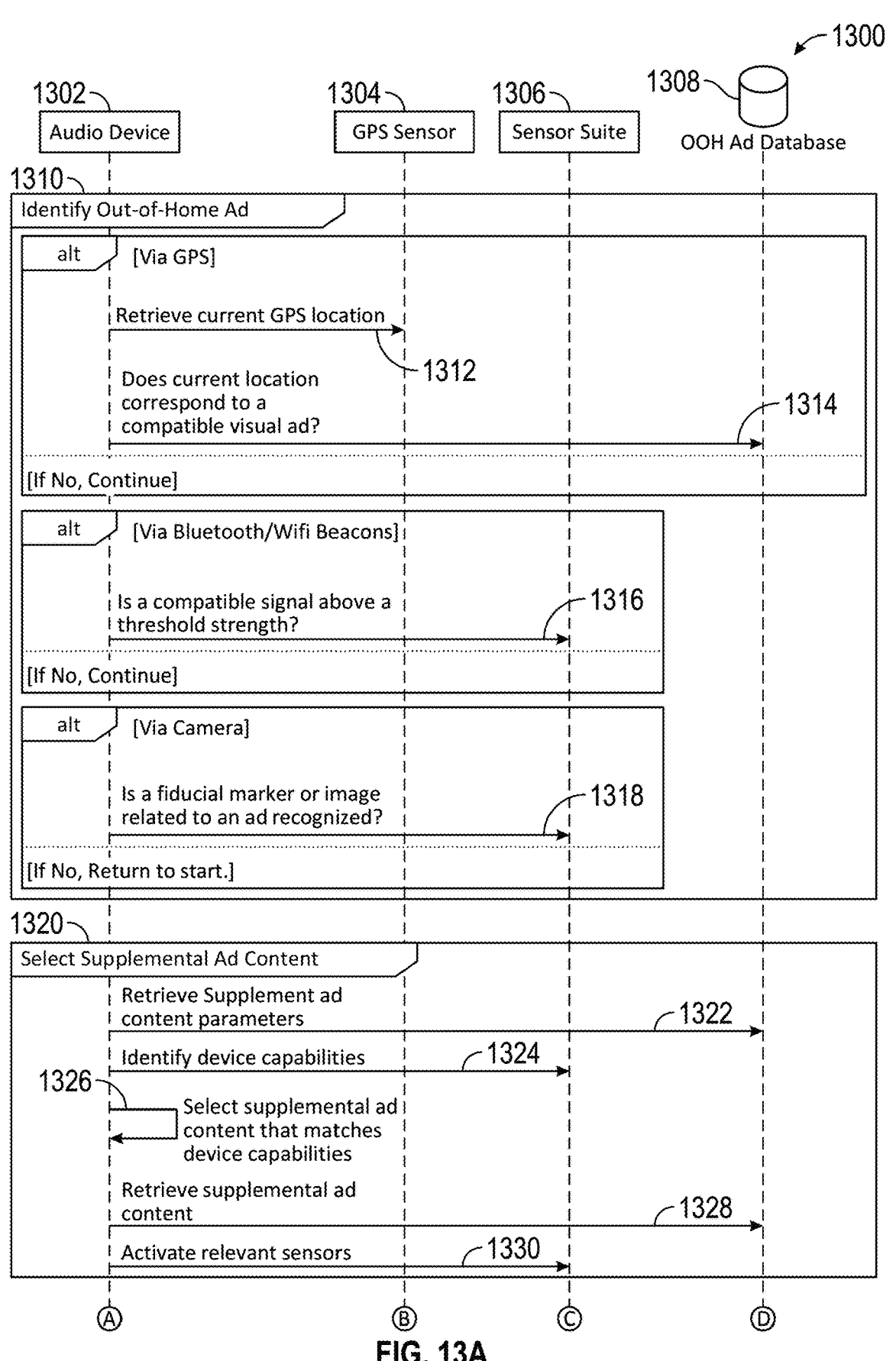
FIGS. 13A and 13B depicts a sequence diagram for selecting supplemental content for an out-of-home advertisement, in accordance with some embodiments of this disclosure.
Figure 13B:
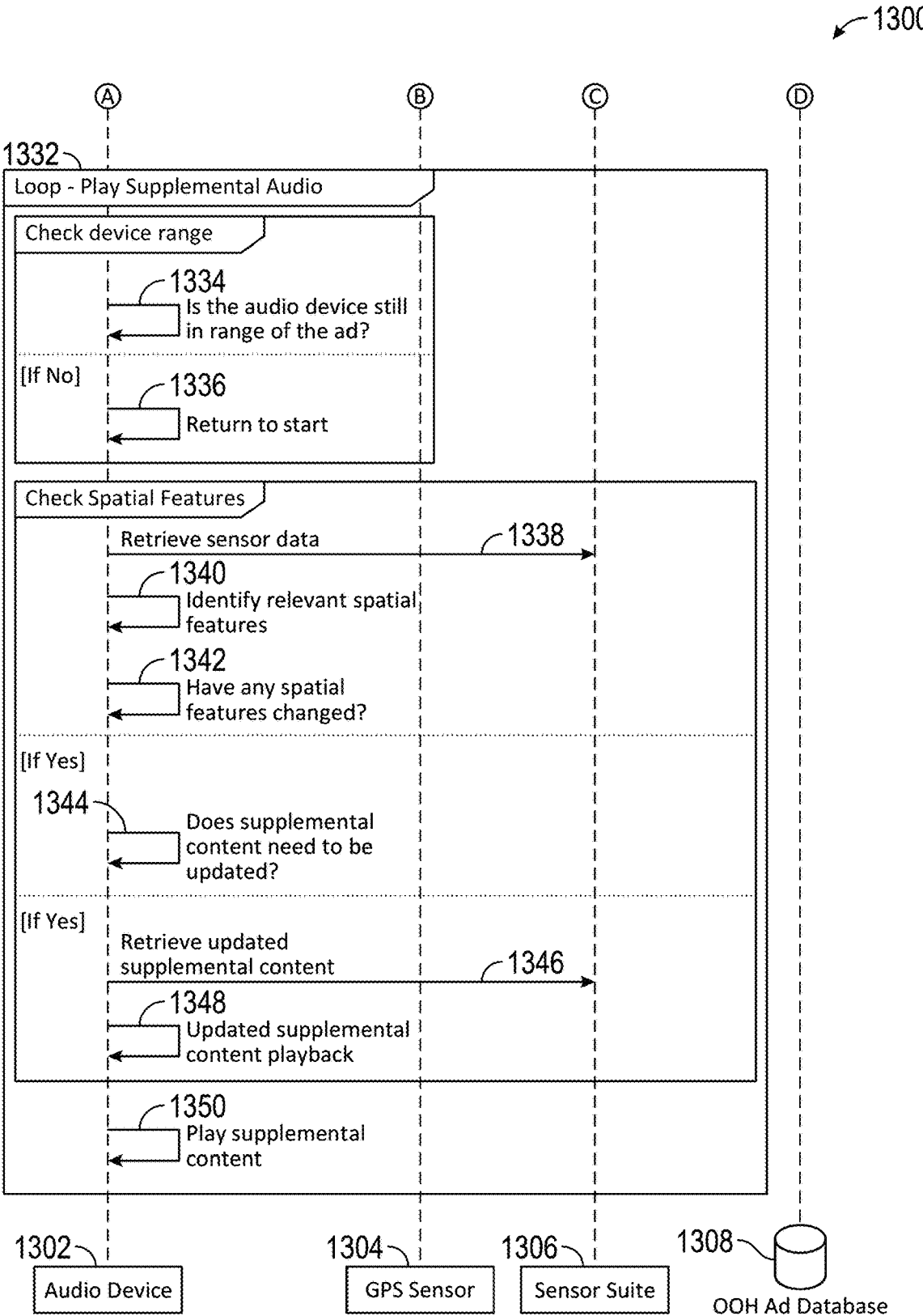

FIGS. 13A and 13B depicts a sequence diagram for selecting supplemental content for an out-of-home advertisement, in accordance with some embodiments of this disclosure. In various embodiments, the individual steps of sequence diagram 1300 may be implemented by one or more components of the devices, systems, and/or methods of FIGS. 1-12 and may be performed in combination with any of the other processes and aspects described herein. Although the present disclosure may describe certain steps of sequence diagram 1300 (and of other processes described herein) as being implemented by certain components of the devices, systems, and/or methods of FIGS. 1-12, this is for purposes of illustration only. It should be understood that other components of the devices, systems and methods of FIGS. 1-12 may implement those steps instead.

In some embodiments, at 1310, control circuitry (e.g., 1104 of FIG. 11 and 1211 of FIG. 12), and/or I/O circuitry 1102 of FIG. 11 may identify an out-of-home advertisement by retrieving the user's location via GPS at 1312 and determining whether or not the user's location corresponds to a compatible visual ad at 1314, via Bluetooth/Wi-Fi beacons at 1316 (e.g., signal strength at least −70 dBm), and/or via sensors at 1318. For example, the control circuitry may determine that user 140 of FIG. 1 is within a media play area for a particular art installation based on input received from the user via museum device 120, based on data or sensor signals provided by museum device 120 (e.g., GPS sensor 1304), or using any other suitable technique, or any combination thereof. As another example, the control circuitry may determine that user 240 of FIG. 2 is in proximity to fixed device 210, e.g., based on input received from the user via user equipment 220, based on data or sensor signals provided by user equipment 220, or using any other suitable technique, or any combination thereof.

In some embodiments, at 1320, the control circuitry may select supplemental ad content by retrieving supplemental ad content parameters at 1322, identifying device capabilities at 1324, selecting supplemental ad content that matches device capabilities at 1326, retrieving supplemental ad content at 1328 from an out-of-home advertisement database 1308, and activating relevant sensors from a sensor suite 1306 at 1330.

In some embodiments, at 1332, the control circuitry may determine whether to update and/or play supplemental content by continuously checking the spatial arrangement of the user, the user device, and/or the fixed device. For example, at 1334, the control circuitry may determine whether the audio device is still in range of the ad. At 1336, if check device range is no, return to start. As another example, the control circuitry may identify relevant spatial features at 1340 via retrieved sensor data at 1338 from a sensor suite 1306, monitor for changes in the relevant spatial features at

1342, determine supplemental content needs to be updated at 1344, retrieve the updated supplemental content at 1346, update the supplemental content play at 1348, and play the updated supplemental content at 1350 through the audio device 1302.

Figure 14:
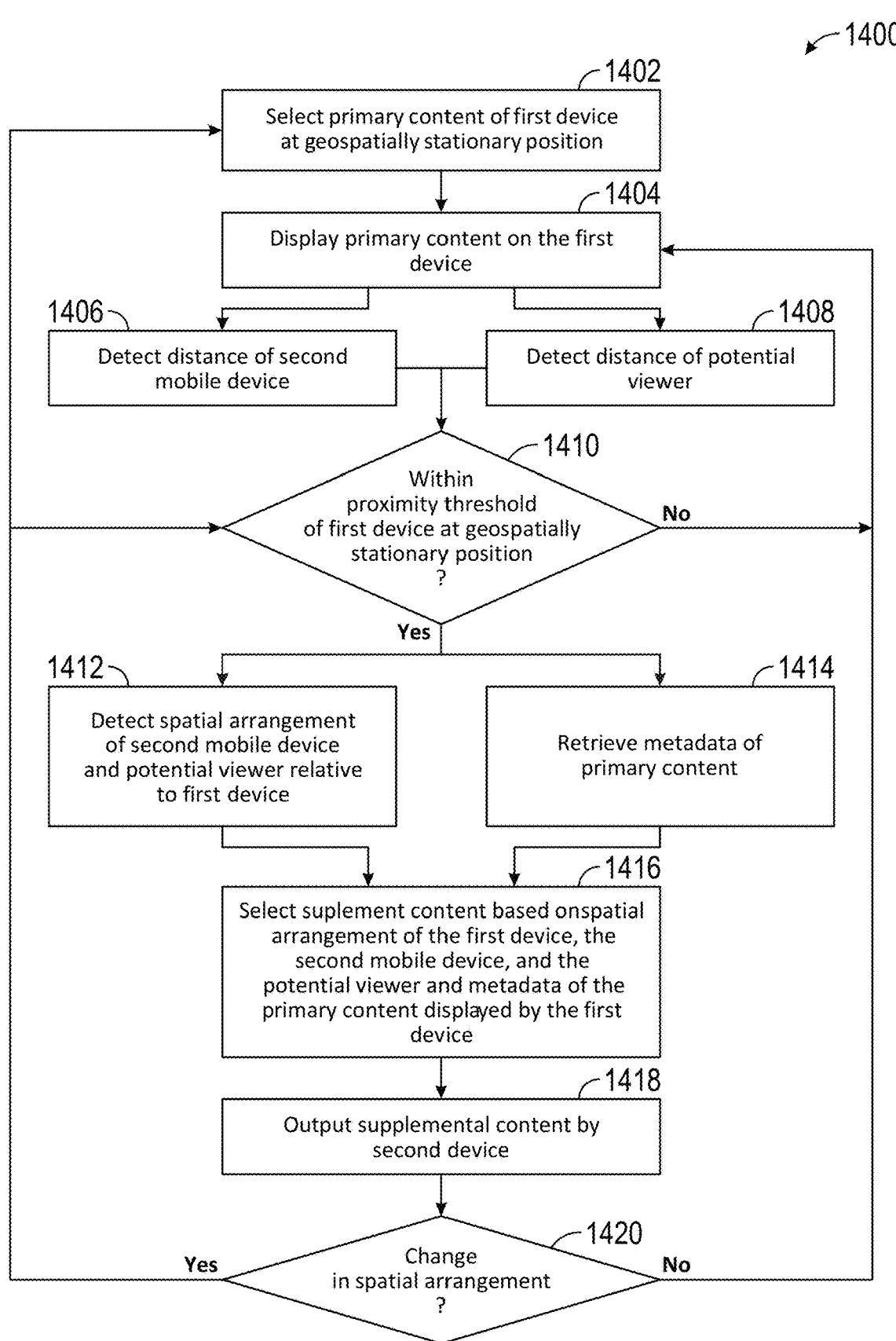
FIG. 14 depicts a flowchart of a process for selecting primary and supplemental content based on spatial arrangement and metadata of the displayed primary content, in accordance with some embodiments of this disclosure.

FIG. 14 depicts a flowchart of a process for selecting primary and supplemental content based on spatial arrangement and metadata of the displayed primary content, in accordance with some embodiments of this disclosure. In various embodiments, the individual steps of process 1400 may be implemented by one or more components of the devices, systems, and/or methods of FIGS. 1-13 and may be performed in combination with any of the other processes and aspects described herein. Although the present disclosure may describe certain steps of process 1400 (and of other processes described herein) as being implemented by certain components of the devices, systems, and/or methods of FIGS. 1-13, this is for purposes of illustration only. It should be understood that other components of the devices, systems and methods of FIGS. 1-13 may implement those steps instead.

In some embodiments, at 1402, the control circuitry (e.g., 1104 of FIGS. 11, 1211 of FIG. 12), may select a primary content item (e.g., from a media content source 1202 via the communication network 1209 of FIG. 12). For example, the control circuitry may select museum information 101 of FIG. 1 to be displayed on display device 110. As another example, the control circuitry may select the primary content to be displayed on the fixed device 210 of FIG. 2. As another example, the control circuitry may select the emergency evacuation information 301 on the fixed device 310 of FIG. 3. In some embodiments, the control circuitry may select primary content based on the spatial arrangement of the fixed device, the mobile device, and/or the potential viewer. In some embodiments, the control circuitry may select primary content based on the spatial arrangement of the fixed device, a plurality of mobile devices, and/or a plurality of potential viewers.

In some embodiments, at 1404, the control circuitry, I/O circuitry, any other suitable circuitry or combination thereof may display the selected primary content on the fixed device. For example, the control circuitry may display the museum information 101 of FIG. 1 on display device 110. In some embodiments, the control circuitry may display selected primary content on a billboard or other fixed device.

In some embodiments, at 1406, the control circuitry may detect the distance of a mobile device. For example, the control circuitry may retrieve the location of the device via a GPS sensor 1304 of FIGS. 13A and 13B, via Bluetooth/Wi-Fi beacons, and/or via camera. As another example, the control circuitry may determine that user device 120 of FIG. 1 is within a media play area for a particular art installation based on input received from the user equipment 120, based on data or sensor signals provided by user equipment 120 (e.g., GPS sensor 1304), or using any other suitable technique, or any combination thereof. As another example, the control circuitry may determine that mobile device 220 of FIG. 2 is in proximity to fixed device 210, e.g., based on input received from the mobile device 220, based on data or sensor signals provided by mobile device 220, or using any other suitable technique, or any combination thereof.

In some embodiments, at 1408, the control circuitry may detect the distance of a potential viewer. For example, the control circuitry may determine that user 140 of FIG. 1 is within a media play area for a particular art installation based on input received from the user via user equipment 120, based on data or sensor signals provided by user equipment 120 (e.g., GPS sensor 1304), or using any other suitable technique, or any combination thereof. As another example, the control circuitry may determine that user 240 of FIG. 2 is in proximity to fixed device 210, e.g., based on input received from the user via user equipment 220, based on data or sensor signals provided by user equipment 220, or using any other suitable technique, or any combination thereof.

In some embodiments, if the mobile device and potential viewer are within a proximity threshold ("yes" at 1410), the process continues at 1410. The control circuitry may determine whether the mobile device and potential viewer are within a proximity threshold of the fixed device. For example, the control circuitry may determine that user 140 and user equipment 120 of FIG. 1 are within a proximity threshold of a particular art installation. In some embodiments, proximity thresholds may change based on the primary content, the supplemental content, and/or spatial arrangement of the fixed device, the mobile device, and the potential viewer. As another example, the control circuitry may determine whether user 240 of FIG. 2 is in proximity to fixed device 210. If neither the mobile device nor the potential viewer is within a proximity threshold, the process reverts to 1404.

In some embodiments, the process continues simultaneously at 1412 and 1414. At 1412, the control circuitry may detect the spatial arrangement of the mobile device and potential viewer relative to the fixed device. For example, the control circuitry may determine the location and/or orientation of user 140 and the location of user equipment 120 of FIG. 1 relative to the fixed device 110 based on input received from the user via user equipment 120, based on data or sensor signals provided by user equipment 120 (e.g., GPS sensor 1304), or using any other suitable technique, or any combination thereof. As another example, the control circuitry may determine the location and/or orientation of user 240 and the location of mobile device 220 of FIG. 2 relative to the fixed device 210 based on input received from the user via user equipment 220, based on data or sensor signals provided by user equipment 220, or using any other suitable technique, or any combination thereof.

In some embodiments, at 1414, the control circuitry, I/O circuitry, any other suitable circuitry or combination thereof may retrieve metadata of the primary content. For example, the control circuitry, I/O circuitry, any other suitable circuitry or combination thereof may retrieve metadata of the museum information 101 displayed on the fixed device 110 of FIG. 1. As another example, the control circuitry, I/O circuitry, any other suitable circuitry or combination thereof may retrieve metadata of the primary content displayed on fixed device 210 of FIG. 2.

In some embodiments, at 1416, the control circuitry may select supplemental content based on the retrieved metadata of the primary content and the spatial arrangement of the fixed device, the mobile device, and the potential viewer. For example, the control circuitry may select the supplemental content 106 of FIG. 1 based on the metadata of the museum information 101 and/or the spatial arrangement of the user 140, the user device 120, and/or the fixed device 110 to direct the user to "look left to see Myron's Discobolus." As another example, the control circuitry may select the supplemental content 205 of FIG. 2 based on the metadata of the primary content displayed on the fixed device 210 and/or the spatial arrangement of the user 240, the mobile device 220, and/or the fixed device 210 to select supplemental content that states "If you want more information, you should look up and to your right."

In some embodiments, at 1418, the control circuitry, I/O circuitry, any other suitable circuitry or combination thereof may output the selected supplemental content by the mobile device. For example, the control circuitry, I/O circuitry, any other suitable circuitry or combination thereof may output the selected supplemental content 106 of FIG. 1 by the user device 120. As another example, the control circuitry, I/O circuitry, any other suitable circuitry or combination thereof may output the selected supplemental content 205 of FIG. 2 by the mobile device 220.

In some embodiments, at 1420, the control circuitry may determine whether there has been a change in the spatial arrangement of the fixed device, the mobile device, or the potential viewer. For example, at 107 of FIG. 1, the control circuitry may determine whether the viewer has turned toward the display based on input received from the user via user equipment 120, based on data or sensor signals provided by user equipment 120, or using any other suitable technique, or any combination thereof.

Figures 15A, 15B:
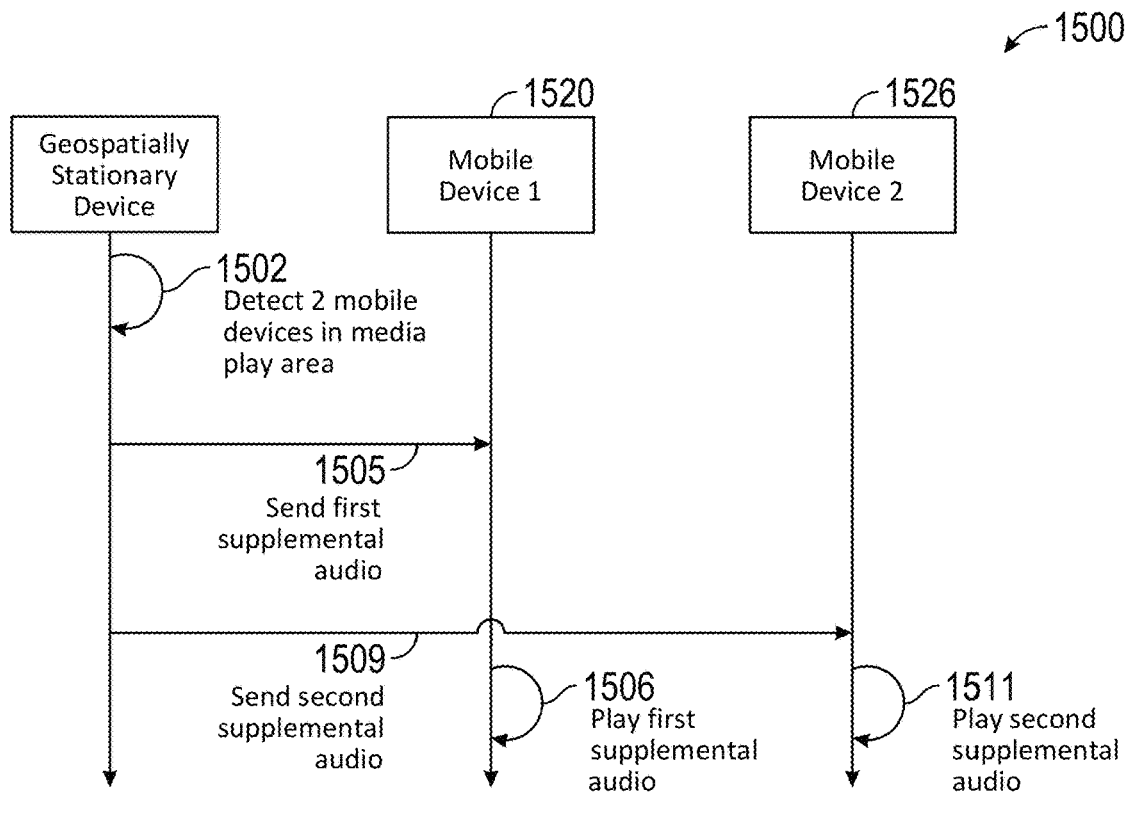
FIG. 15A depicts a flow diagram of a process for playing first supplemental audio and second supplemental audio concurrently on mobile devices, in accordance with some embodiments of this disclosure.
FIG. 15B depicts a flow diagram of a process for playing first supplemental audio concurrently on mobile devices, in accordance with some embodiments of this disclosure.

FIG. 15A depicts a flow diagram of a process 1500 for playing first supplemental audio and second supplemental audio concurrently on mobile devices, in accordance with some embodiments of this disclosure.

In some embodiments, at 1502, the system may detect that multiple mobile devices are within a media play area or media landscape and can output supplemental content. For example, the media landscape as depicted in FIG. 5 includes a primary media play area 525 and several secondary media play areas 521-524 and 526-529. For example, the primary media play area may play first supplemental audio and the secondary media play areas may play second supplemental audio. An audio landscape is not limited to defined areas. For example, media play areas may be adjusted in size or location or may be converted from primary to secondary, tertiary, etc. or vice versa. Additionally, mobile devices may be selected according to the requirements of the system regardless of location within the media landscape. At 1505, the system sends the first supplemental audio to the first mobile device 1520. At 1509, the system sends the second supplemental audio to the second mobile device 1526. Alternatively, the system may transmit the audio contents at the same time. At 1506 and 1511, the first mobile device 1520 plays the first supplemental audio and the second mobile device 1526 plays the second supplemental content simultaneously.

FIG. 15B depicts a flow diagram of a process 1550 for playing first supplemental audio concurrently on mobile devices, in accordance with some embodiments of this disclosure.

In some embodiments, at 1522, the system may detect multiple mobile devices are within a media play area and can output supplemental content. For example, a media play area is depicted in 125 of FIGS. 1, 525 of FIG. 5, and 625 of FIG. 6. At 1525, the system sends the first supplemental audio to the first mobile device 1540. At 1529, the system sends the first supplemental audio to the second mobile device 1546. Alternatively, the system may transmit the audio contents at the same time. At 1560 and 1560', first mobile device 1540 and the second mobile device 1546 play the first supplemental audio simultaneously.

Figure 16:
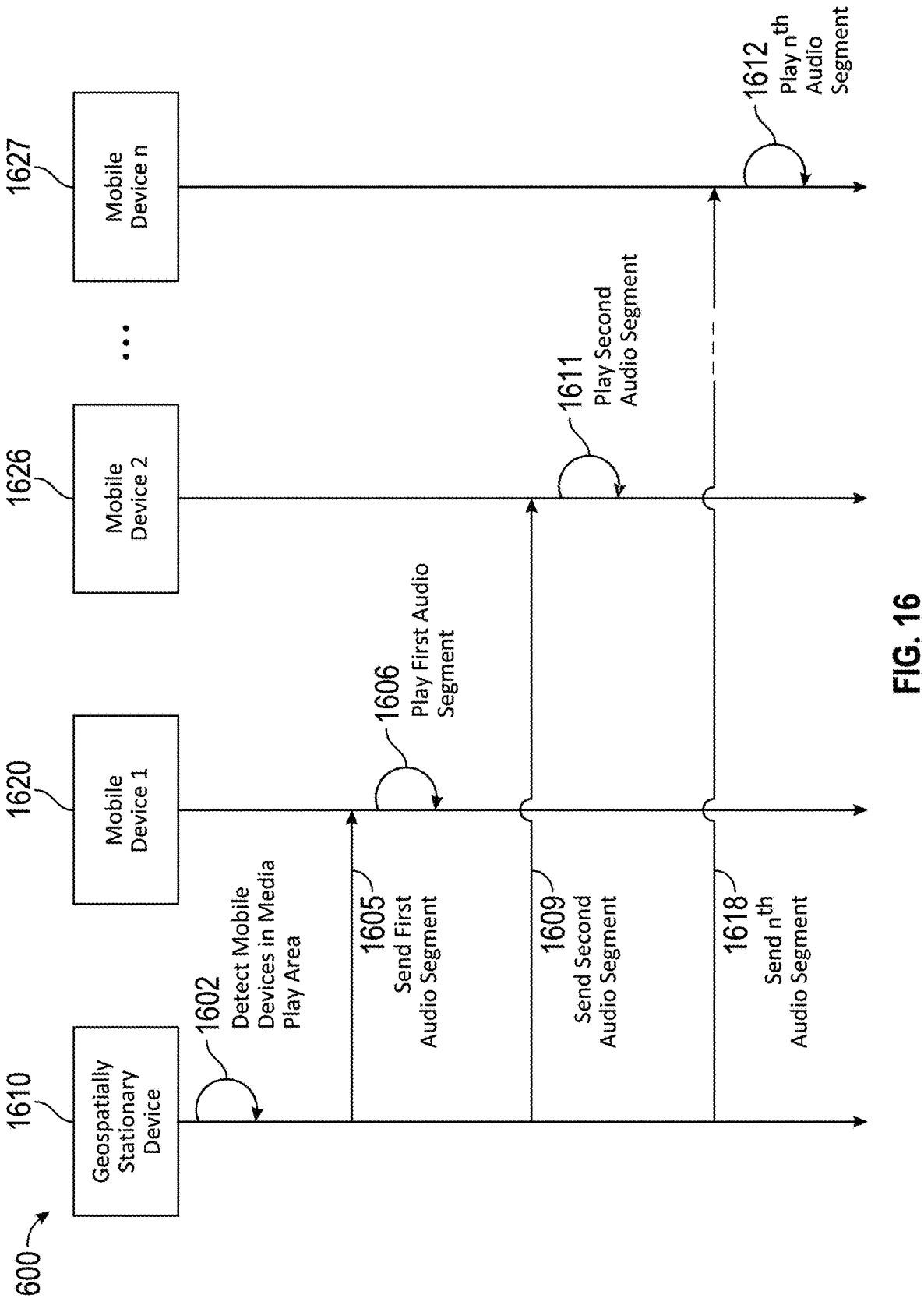
FIG. 16 depicts a flow diagram of a process for playing portions of audio content sequentially on mobile devices, in accordance with some embodiments of this disclosure.

FIG. 16 depicts a flow diagram of a process 1600 for playing portions of audio content (e.g., 1605, 1609, 1618) sequentially on mobile devices (e.g., 1620, 1626, and 1627), in accordance with some embodiments of this disclosure.

In some embodiments, the system may determine multiple mobile devices are required to output supplemental content. For example, outputting the jingle displayed in FIG.

6. To facilitate this, the system may follow process 1600. At 1602, the system detects mobile devices 1620, 1626, and 1627 in or approaching the media play area (e.g., 125 of FIG. 1, 525 of FIG. 5, and 625 of FIG. 6) of the geospatially stationary device 1610. At 1605, the system sends the first audio segment to the first mobile device 1620. At 1606, the first mobile device 1620 plays the first audio segment (e.g., vehicle 620 playing note 606 in FIG. 6). At 1609, the system sends the second audio segment to the second mobile device 1626. At 1611, the second mobile device 1626 plays the second audio segment (e.g., vehicle 626 playing note 611 in FIG. 6). The system repeats this process for n number of mobile devices required to output 1612 the supplement content. The system may recruit or route additional devices to a media play area, for example as depicted in FIG. 6, to play supplemental content.

FIG. 17 depicts a flowchart of a process 1700 for sequencing and assigning audio segments to be played in a media play area, in accordance with some embodiments of this disclosure.

In some embodiments, at 1702, the system may determine a sequence of audio segments to be played sequentially in a media play area. For example, the system may determine that the sequence of audio segments 606, 611, 612, and 613 of FIG. 6 are to be played in the media play area 625.

In some embodiments, at 1704, the system may identify available media devices in the vicinity of the media play area. For example, the system may identify available media devices 620, 626, 627, and 628 of FIG. 6 to be in the vicinity of the media play area 625.

In some embodiments, at 1706, the system may determine whether a sufficient number of available media devices are in the vicinity of the media play area. For example, if there are not sufficient available media devices (e.g., the number of audio segments is greater than the available devices transiting the media area can play, a large crowd exceeds the threshold of audience members the available devices can reach, etc.), at 1708, the system may route additional available distance media devices to the media play area. The system may identify several distant media devices not in the vicinity of the media play area that are available for playing media. For example, these media devices may be enrolled in or opted-in to the media application as available supplemental devices where their location is shared with the system. The system may recruit distant media devices to the vicinity of the media play area by transmitting navigational directions to the media pay area. For example, a navigation application of the distant media device may generate for display the navigation path to the media play area.

In some embodiments, the system may determine there are sufficient available media devices. For example, at 1710, the system may then determine a position and velocity of each media device. For example, the system may determine a position and velocity of media devices 620, 626, 627, and 628 of FIG. 6. For example, velocity may be determined through the comparison of two or more detected time-stamped positions of the media device in vicinity of the media play area.

In some embodiments, at 1712, the system may estimate the arrival time of each media device into the media play area. For example, the system may estimate the arrival by using the determined position (e.g., distance from the media play area) and velocity. For example, the system may estimate the arrival by accessing a navigation path being provided by a navigation application of the respective media device and determine the time when the navigation path provided by the navigation application will intersect the media play area. For example, the system may estimate the arrival time of media devices 620, 626, 627, and 628 of FIG. 6 into the media play area 625.

In some embodiments, at 1714, the system may assign an audio segment to each media device. For example, the system may assign the sequence of audio segments 606, 611, 612, and 613 of FIG. 6 to media devices 620, 626, 627, and 628. In some embodiments, the system may assign the segment to more than one device or the system may assign multiple segments to one device. In some embodiments, the system may continue to monitor media devices in relation to the media play area and reassign segments or prioritize media devices of the same assignment.

In some embodiments, at 1716, the system may determine when each media device has entered the media play area. For example, the system may determine that media device 626 of FIG. 6 has entered the media play area 625. For example, a sensor (e.g., cameras, GPS, fiducial markers, lidar, etc.) may detect that a media device has entered the media play area and will transmit the assigned segment to the media device.

In some embodiments, at 1718, the system may cause the media devices to output the respective assigned audio segment. For example, the system may output the assigned audio segment 611 of FIG. 6 by media device 626. In some embodiments, the system may cause the respective media device to play the assigned respective audio segment at the respective estimated arrival time into the media play area. In some embodiments, the system may cause the geo-stationary media device to play media complimentary to the sequence of audio segments as the plurality of vehicles transit the media play area. For example, as media devices 620, 626, 627, and 628 of FIG. 6 play audio segments 606, 611, 612, and 613, billboard 610 may display a video out-of-home (OOH) advertisement 601 that shows visual content synchronized with the sequence of audio segments.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

What is claimed is:

1. A method comprising:
  identifying, in proximity of a first device that is located at a geospatially stationary position: (a) a second device, wherein the second device is a mobile device; and (b) a potential viewer of the first device, wherein the first device is configured to output a primary content;

selecting supplemental content for output by the second
device, wherein the selecting is based at least in part on:
(a) a spatial arrangement of the first device, the second
device, and the potential viewer; and (b) metadata of
the primary content displayed by the first device,
wherein the selecting the supplemental content for
output by the second device comprises:
detecting an orientation of the potential viewer relative
to the first device;
based on determining that the orientation of the poten-
tial viewer is not directed to the first device:
generating a directional cue, wherein the directional
cue guides the potential viewer to a point of
interest based at least in part on the orientation;
and
selecting the supplemental content that comprises
the directional cue; and
causing the second device to output the supplemental
content.

2. The method of claim 1, wherein the spatial arrangement
comprises: (a) a spatial position of the potential viewer
relative to the first device; (b) a spatial orientation of the
potential viewer relative to the first device; and (c) a spatial
position of the second device relative to the first device.

3. The method of claim 1, wherein selecting the supple-
mental content for output by the second device further
comprises:
detecting a vertical position of the potential viewer rela-
tive to the first device;
detecting a horizontal position of the potential viewer
relative to the first device; and
generating the directional cue further based at least in part
on one or more of (a) the detected vertical position of
the potential viewer, or (b) the detected horizontal
position of the potential viewer.

4. The method of claim 3, wherein the point of interest is
the geospatially stationary position of the first device.

5. The method of claim 1, further comprising:
detecting a change in the spatial arrangement of the
potential viewer towards the geospatially stationary
position of the first device, wherein the detected change
is attributable to the supplemental content;
generating a different directional cue to a different loca-
tion based at least in part on the detected change in the
spatial arrangement;
modifying the primary content, wherein the modified
primary content comprises the different directional cue
to the different location; and
causing the first device to output the modified primary
content.

6. The method of claim 1, wherein selecting the supple-
mental content for output by the second device further
comprises:
detecting a position of the potential viewer relative to the
first device;
detecting a line of sight of the potential viewer from the
detected position relative to the first device;
based on the detecting that the line of sight of the potential
viewer is not in view of the primary content, generating
a cue, wherein the cue is to perform at least one of
positioning the potential viewer or orienting the poten-
tial viewer, such that the line of sight of the potential
viewer is guided to the point of interest; and
wherein the selecting the supplemental content comprises
selecting the supplemental content that comprises the
cue to orient.

7. The method of claim 1 wherein selecting the supple-
mental content for output by the second device further
comprises:
detecting a vertical position of the second device relative
to the first device;
detecting a horizontal position of the second device
relative to the first device; and
determining, based on the detected positions, a media play
area in which the second device is located; and
selecting the supplemental content of the media play area.

8. The method of claim 7, further comprising:
detecting at least one additional supplemental device
located in the media play area; and
coordinating the second device and the at least one
additional supplemental device to output the supple-
mental content simultaneously.

9. The method of claim 8, wherein the coordinating
comprises causing the second device to output message
audio and causing the at least one additional supplemental
device to output ambience audio.

10. The method of claim 7, further comprising:
detecting the second device outputting the supplemental
content is leaving the media play area;
detecting at least one additional supplemental device
entering the media play area; and
coordinating the second device and the at least one
additional supplemental device to output the supple-
mental content in sequence.

11. The method of claim 1, further comprising detecting
in proximity of the first device a plurality of potential
viewers of the first device; and
wherein selecting the supplemental content for output by
the second device is further based on at least one of: a
number of the plurality of potential viewers detected,
average viewer distance from the first device, or a
number of viewers with clear field of view of the first
device.

12. The method of claim 1, further comprising:
detecting a third mobile device, wherein the third mobile
device is not in proximity of the first device;
wherein the third mobile device is a vehicle with external
speakers; and
causing the third mobile device to output navigation
directions towards the first device.

13. A system comprising:
a memory;
control circuitry configured to:
identify, in proximity of a first device that is located at
a geospatially stationary position (a) a second
device, wherein the second device is a mobile
device; and (b) a potential viewer of the first device,
wherein the first device is configured to output a
primary content;
select supplemental content for output by the second
device, wherein the selecting is based at least in part
on: (a) a spatial arrangement of the first device, the
second device, and the potential viewer; and (b)
metadata of the primary content displayed by the first
device, wherein the control circuitry configured to
select the supplemental content for output by the
second device is further configured to:
detect an orientation of the potential viewer relative
to the first device;
based on determining that the orientation of the
potential viewer is not directed to the first device:

generate a directional cue, wherein the directional cue guides the potential viewer to a point of interest based at least in part on the orientation; and select the supplemental content that comprises the directional cue; and input/output circuitry configured to:

cause the second device to output the supplemental content.

14. The system of claim 13, wherein the spatial arrangement comprises: (a) a spatial position of the potential viewer relative to the first device; (b) a spatial orientation of the potential viewer relative to the first device; and (c) a spatial position of the second device relative to the first device.

15. The system of claim 13, wherein the control circuitry configured to select the supplemental content for output by the second device is further configured to:

detect a vertical position of the potential viewer relative to the first device;

detect a horizontal position of the potential viewer relative to the first device; and generate the directional cue further based at least in part on one or more of (a) the detected vertical position of the potential viewer, or (b) the detected horizontal position of the potential viewer.

16. The system of claim 15, wherein the point of interest is the geospatially stationary position of the first device.

17. The system of claim 13, wherein the control circuitry is further configured to:

detect a change in the spatial arrangement of the potential viewer towards the geospatially stationary position of the first device, wherein the detected change is attributable to the supplemental content;

generate a different directional cue to a different location based at least in part on the detected change in the spatial arrangement;

modify the primary content, wherein the modified primary content comprises the different directional cue to the different location; and wherein the input/output circuitry is further configured to cause the first device to output the modified primary content.

18. The system of claim 13, wherein the control circuitry configured to select the supplemental content for output by the second device is further configured to:

detect a position of the potential viewer relative to the first device;

detect a line of sight of the potential viewer from the detected position relative to the first device;

based on the detecting that the line of sight of the potential viewer is not in view of the primary content, generate a cue, wherein the cue is to perform at least one of positioning the potential viewer or orienting the potential viewer, such that the line of sight of the potential viewer is guided to the point of interest; and select the supplemental content by selecting the supplemental content that comprises the cue to orient.

19. The system of claim 13 wherein the control circuitry configured to select the supplemental content for output by the second device is further configured to:

detect a vertical position of the second device relative to the first device;

detect a horizontal position of the second device relative to the first device; and determine, based on the detected positions, a media play area in which the second device is located; and select the supplemental content of the media play area.

20. The system of claim 19, wherein the control circuitry is further configured to:

detect at least one additional supplemental device located in the media play area; and wherein the input/output circuitry is further configured to coordinate the second device and the at least one additional supplemental device to output the supplemental content simultaneously.

* * * * *